United States Patent
Harrison et al.

(10) Patent No.: US 9,111,229 B2
(45) Date of Patent: Aug. 18, 2015

(54) QUANTUM REPEATER AND SYSTEM AND METHOD FOR CREATING EXTENDED ENTANGLEMENTS

(75) Inventors: Keith Harrison, Chepstow (GB); William Munro, Bristol (GB); Kae Nemoto, Tokyo (JP)

(73) Assignees: Hewlett-Packard Development Company, L.P., Houston, TX (US); Inter-University Research Institute Corporation Research Organization of Information and Systems, Tokyo (JP)

(*) Notice: Subject to any disclaimer, the term of this patent is extended or adjusted under 35 U.S.C. 154(b) by 806 days.

(21) Appl. No.: 13/378,383

(22) PCT Filed: Oct. 26, 2009

(86) PCT No.: PCT/EP2009/064069
§ 371 (c)(1),
(2), (4) Date: Feb. 29, 2012

(87) PCT Pub. No.: WO2011/000443
PCT Pub. Date: Jan. 6, 2011

(65) Prior Publication Data
US 2012/0148237 A1 Jun. 14, 2012

(30) Foreign Application Priority Data
Jun. 30, 2009 (GB) .................................. 0911274.9

(51) Int. Cl.
*H04B 10/02* (2006.01)
*G06N 99/00* (2010.01)
(Continued)

(52) U.S. Cl.
CPC .............. *G06N 99/002* (2013.01); *B82Y 10/00* (2013.01); *H04L 9/0855* (2013.01); *H04L 9/12* (2013.01); *H04L 2209/38* (2013.01)

(58) Field of Classification Search
CPC .... H04B 10/70; H04L 9/0855; H04L 9/0852; B82Y 10/00
USPC ........... 398/173, 175, 140, 154, 155, 37, 180, 398/181, 177, 141, 158, 159, 39, 40; 380/278, 256, 255, 279, 283
See application file for complete search history.

(56) References Cited

U.S. PATENT DOCUMENTS
8,103,172 B2 * 1/2012 Peters et al. .................. 398/173
8,270,841 B2 * 9/2012 Nishioka et al. .............. 398/140
(Continued)

FOREIGN PATENT DOCUMENTS
EP 1383267 B1 5/2006
EP 1865657 A1 12/2007
(Continued)

OTHER PUBLICATIONS
Bennett, et al "Teleporting an Unknown Quantum State Via Dual Classical and Einstein-Podolsky-Rosen Channels", Physical Review Letters, American Physical Society, New York, US LNKD-DOI: 10.1103/PHYSREVLETT.70.1895, vol. 70, No. 13, Mar. 29, 1993, pp. 1895-1899.
(Continued)

Primary Examiner — Hanh Phan
(74) Attorney, Agent, or Firm — Hewlett-Packard Patent Department

(57) ABSTRACT

A method is provided of creating an end-to-end entanglement (87) between qubits in first and second end nodes (81, 82) of a chain of optically-coupled nodes whose intermediate nodes (80) are quantum repeaters. Local entanglements (85) are created on an on-going basis between qubits in neighboring pairs in the chain through interaction of the qubits with light fields transmitted between the nodes. The quantum repeaters (80) are cyclically operated with their top-level operating cycles being synchronized. Once every top-level operating cycle, each repeater (80) initiates a merging of two entanglements involving respective repeater qubits that are at least expected to be entangled with qubits in nodes disposed in opposite directions along the chain from the repeater. A quantum repeater (80) adapted for implementing this method is also provided.

17 Claims, 19 Drawing Sheets

(51) Int. Cl.
*B82Y 10/00* (2011.01)
*H04L 9/08* (2006.01)
*H04L 9/12* (2006.01)

(56) References Cited

U.S. PATENT DOCUMENTS

| | | |
|---|---|---|
| 2003/0002674 A1 | 1/2003 | Nambu et al. |
| 2004/0131179 A1 | 7/2004 | Ichimura et al. |
| 2005/0111665 A1 | 5/2005 | Ichimura et al. |
| 2008/0258049 A1 | 10/2008 | Kuzmich et al. |
| 2009/0317089 A1 | 12/2009 | Peters et al. |

FOREIGN PATENT DOCUMENTS

| | | |
|---|---|---|
| GB | 2456347 | 10/2010 |
| JP | 2007329865 A | 12/2007 |
| WO | WO-02/097725 A2 | 12/2002 |
| WO | WO-2006/019858 | 2/2006 |
| WO | WO-2006/019858 A2 | 2/2006 |
| WO | WO-2007/021945 A2 | 2/2007 |
| WO | WO-2007/102408 A1 | 9/2007 |
| WO | WO-2009/155486 | 12/2009 |

OTHER PUBLICATIONS

Chin-Wen Chou et al: "Functional Quantum Nodes for Entanglement Distribution Over Scalable Quantum Networks" Science American Association for the Advancement of Science USA , vol. 326, No. 5829, Jun. 1, 2007, pp. 1316-1320.

Collins, et al; "Multiplexed Memory-Insensitive Quantum Repeaters"; Physical Review Letters, American Physical Society, New York, US LNKDDOI:10.II03/Physrevlett.98.060502, vol. 98, No. 6, Feb. 9, 2007, pp. 60502/1-60502/4.

Duan, et al; "Long-Distance Quantum Communication With Atomic Ensembles and Linear Optics", Nature, vol. 414, pp. 413-418, Nov. 22, 2001.

GB Search Report Received in GB Application No. 0911274.9, mailed Sep. 8, 2010 pp. 6.

International Search Report and Written Opinion Received in PCT Application No. PCT/EP2009/064069, Mailed Nov. 2, 2010, pp. 14.

Razavi, et al; "Physical and Architectural Considerations in Quantum Repeaters", Proceedings of the International Society for Optical Engineering, Quantum Communications Realized II, San Jose, US, Jan. 28, 2009, vol. 7236, pp. 723603-723615.

Van Meter, et al; "System Design for a Long-Line Quantum Repeater," IEEE/ACM Transaction on Networking, vol. 17, No. 3, Jun. 1, 2009, pp. 12.

Wu Xiang-Sheng; Memory-Based Quantum Repeater in Quantum Information Communication, China Phys. Soc. and IOP Publishing Ltd., vol. 13, No. 2, Feb 2, 2004, pp. 5.

Jiang, L. et al,, "Quantum repeater with encoding," The American Physical Society, Physical Review A 79, Mar. 20, 2009, pp. 32325-1-032325-10.

Van Loock, P. et al., "Hybrid Quantum Repeater Using Bright Coherent Light," The American Physical Society, Physical Review Letters, vol. 96, Jun. 23, 2006, pp. 240501-1-240501-4.

\* cited by examiner

ELONGATE OPERATION (a)

(b)

(c)

"X Measurement" 12

(d)

QUANTUM REPEATER AND SYSTEM AND METHOD FOR CREATING EXTENDED ENTANGLEMENTS

The present invention relates to quantum repeaters and to systems and methods for creating extended entanglements.

BACKGROUND OF THE INVENTION

In quantum information systems, information is held in the "state" of a quantum system; typically this will be a two-level quantum system providing for a unit of quantum information called a quantum bit or "qubit". Unlike classical digital states which are discrete, a qubit is not restricted to discrete states but can be in a superposition of two states at any given time.

Any two-level quantum system can be used for a qubit and several physical implementations have been realized including ones based on the polarization states of single photons, electron spin, nuclear spin, and the coherent state of light.

Quantum network connections provide for the communication of quantum information between remote end points. Potential uses of such connections include the networking of quantum computers, and "quantum key distribution" (QKD) in which a quantum channel and an authenticated (but not necessarily secret) classical channel with integrity are used to create shared, secret, random classical bits. Generally, the processes used to convey the quantum information over a quantum network connection provide degraded performance as the transmission distance increases thereby placing an upper limit between end points. Since in general it is not possible to copy a quantum state, the separation of endpoints cannot be increased by employing repeaters in the classical sense.

One way of transferring quantum information between two spaced locations uses the technique known as 'quantum teleportation'. This makes uses of two entangled qubits, known as a Bell pair, situated at respective ones of the spaced locations; the term "entanglement" is also used in the present specification to refer to two entangled qubits. The creation of such a distributed Bell pair is generally mediated by photons sent over an optical channel (for example, an optical waveguide such as optical fibre). Although this process is distance limited, where a respective qubit from two separate Bell Pairs are co-located, it is possible to combine (or 'merge') the Bell pairs by a local quantum operation effected between the co-located qubits. This process, known as 'entanglement swapping', results in an entanglement between the two non co-located qubits of the Bell pairs while the co-located qubits cease to be entangled at all.

The device hosting the co-located qubits and which performs the local quantum operation to merge the Bell pairs is called, a "quantum repeater". The basic role of a quantum repeater is to create a respective Bell pair with each of two neighbouring spaced nodes and then to merge the Bell pairs. By chaining multiple quantum repeaters, an end-to-end entanglement can be created between end points separated by any distance thereby permitting the transfer of quantum information between arbitrarily-spaced end points.

It may be noted that while QKD does not directly require entangled states, the creation of long-distance Bell pairs through the use of quantum repeaters facilitates long-distance QKD. Furthermore, most other applications of distributed quantum computation will use distributed Bell pairs.

The present invention is concerned with the creation of entanglement between spaced qubits and with the form, management and interaction of quantum repeaters to facilitate the creation of entanglements between remote end points.

SUMMARY OF THE INVENTION

According to the present invention, there is provided a quantum repeater as set out in the accompanying claim 1. The quantum repeater is usable as an intermediate node in a chain of nodes, to permit an end-to-end entanglement between qubits in end nodes of the chain of nodes Also provided is a method of creating an end-to-end entanglement between qubits in end nodes of a chain of nodes whose intermediate nodes are quantum repeaters, the method being as set out in accompanying claim 13.

BRIEF DESCRIPTION OF THE DRAWINGS

Embodiments of the invention will now be described, byway of non-limiting example, with reference to the accompanying diagrammatic drawings, in which.

BEST MODE OF CARRYING OUT THE INVENTION

Figure 1A:
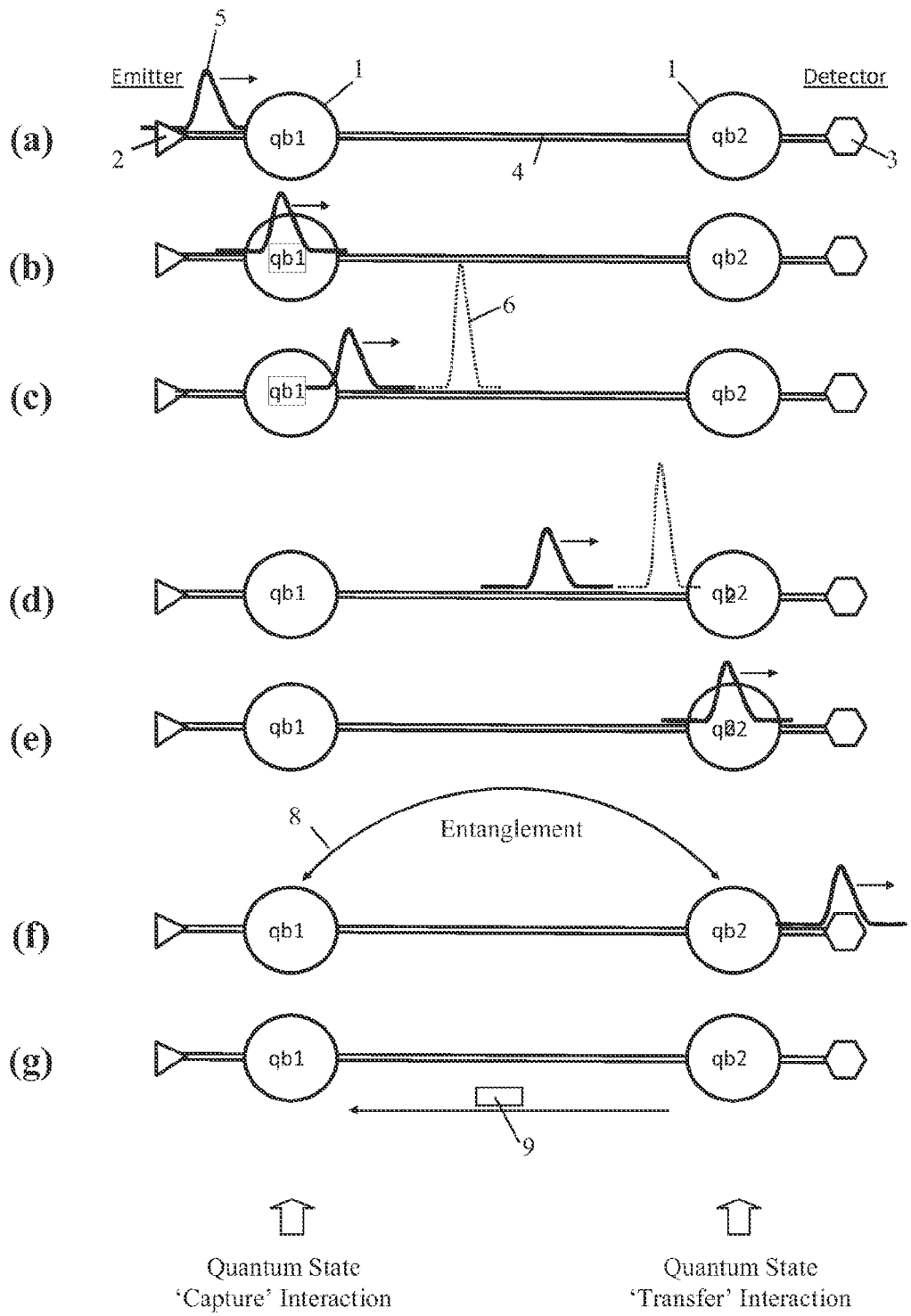
FIG. 1A is a diagram depicting a known operation for entangling two qubits.

Basic Entanglement Creation and Extension Operations
Entanglement Operation (FIG. 1A)

FIG. 1A depicts, in general terms, a known process (herein referred to as an "entanglement operation") for entangling two qubits qb1, qb2 (referenced 1) to create a Bell pair, the Figure showing a time series of snapshots (a) to (g) taken over the course of the entanglement operation. Where, as in the present case, the qubits qb1, qb2 are separated by a distance greater than a few millimeters, the creation of a Bell pair is mediated by photons, which may be sent through free space or over a waveguide such as optical fibre 4. Very generally, processes for Bell-pair creation may be divided into those that use very weak amounts of light (single photons, pairs of photons, or laser pulses of very few photons) and those that use pulses of many photons from a coherent source, such as a laser. As will be understood by persons skilled in the art, the details of the methods of creating photons, performing entanglement operations, and making measurements differ depending on whether very weak amounts of light or laser pulses of many photons are used; however, as the present invention can be implemented using any such approach, the following description will be couched simply in terms of a "light field" being used to create (and subsequently extend) Bell Pairs.

Considering FIG. 1A in more detail, a light field 5 emitted by an emitter 2 (snapshot (a)) is passed through the physical qubit qb1 (snapshot (b)) which is in a prepared non-classical state (for example: 0, +1); typically, the physical qubit implementation is as electron spin, the electron being set into a predetermined state immediately prior to passage of the light field. The light field 5 and qubit qb1 interact, with the light field 5 effectively 'capturing' the quantum state of the qubit qb1. The light field 5 then travels down the optical fibre 4 (snapshots (c) and (d)) and interacts with qubit qb2 (snapshot (e)) before being measured at detector 3 (snapshot (f)); if successful, this results in the 'transfer' of the quantum state of qubit qb1 to qubit qb2, entangling these qubits (in FIG. 1A, this entanglement is represented by double-headed arrowed arc 8, this form of representation being used generally throughout the drawings to depict entanglements). The properties of the light field 5 measured by detector 13 enable a determination to be made as whether or not the entanglement operation was successful. The success or failure of the entanglement operation is then passed back to the qb1 end of the fibre 4 in a classical (non-quantum) message 9 (snapshot (g)). This message can be very simple in form (the presence or absence of a single pulse) and as used herein the term "message" is to be understood to encompass both such simple forms as well as structured messages of any degree of complexity (subject to processing time constraints); in embodiments where the message 9 needs to identify a particular qubit amongst several as well as the success or failure of an entanglement operation, the message may still take the form of the presence or absence of a single pulse with the timing of the latter being used to identify the qubit concerned. Where there is a need to transmit information about the success/failure of the entanglement operation (or to identify an involved qubit) back to the qb1 end of the fibre 4, the overall elapsed time for the entanglement operation is at least the round trip propagation time along the fibre 4, even where the entanglement operation is successful.

An entanglement operation can be performed to entangle qubits qb1 and qb2 whether or not qb2 is already entangled with another qubit (in the case of qb2 already being entangled with another qubit qbj when an entanglement operation is performed between qb1 and qb2, this results in the states of all three qubits qb1, qb2 and qbj becoming entangled).

The properties of the light field 5 measured by detector 3 also enable a determination to be made, in the case of a successful entanglement operation, as to whether the entangled states of the qb1 and qb2 are correlated, or anti-correlated, this generally being referred to as the 'parity' of the entanglement (even and odd parity respectively corresponding to correlated and anti-correlated qubit states). It is normally important to know the parity of an entanglement when subsequently using it; as a result, either parity information must be stored or steps taken to ensure that the parity always ends up the same (for example, if an odd parity is determined, the state of qb2 can be flipped to produce an even parity whereby the parity of the entanglement between qb1 and qb2 always ends up even).

In fact, the relative parity of two entangled, qubits is a two dimensional quantity often called the "generalized parity" and comprising both a qubit parity value and a conjugate qubit parity value. For a simple entanglement operation as depicted in FIG. 1A, the conjugate qubit parity value information is effectively even parity and need not be measured. "Generalized parity" requires two classical bits to represent it. In certain applications (such as QKD), knowledge of the conjugate qubit parity value information may not be required. Hereinafter, except where specific reference is being made to one of the components of "generalized parity" (that is, to the qubit parity value or the conjugate qubit parity value), reference to "parity" is to be understood to mean "generalized parity" but with the understanding that in appropriate cases, the conjugate qubit parity value information can be omitted.

As already indicated, the qubits qb1 and qb2 are typically physically implemented as electron spin. However, the practical lifetime of quantum information stored in this way is very short (of the order of $10^{-6}$ seconds cumulative) and therefore generally, immediately following the interaction of the light field 5 with qb1 and qb2, the quantum state of the qubit concerned is transferred to nuclear spin which has a much longer useful lifetime (typically of the order of a second, cumulatively). The quantum state can be later transferred back to electron spin for a subsequent light field interaction (such as to perform a merge of two entanglements, described below).

Another practical feature worthy of note is that the physical qubits qb1 and qb2 are generally kept shuttered from light except for the passage of light field 5. To facilitate this at the qb2 end of the fibre 4 (and to trigger setting the qubit into a prepared state immediately prior to its interaction with light field 5), the light field 5 can be preceded by a 'herald' light pulse 6; this light pulse is detected at the qb2 end of the fibre 14 and used to trigger priming of the qubit qb2 and then its un-shuttering for interaction with the light field 5. Other ways of triggering these tasks are alternatively possible.

The relationship between the probability of successfully creating a Bell pair, the distance between qubits involved, and the fidelity of the created pair is complex. By way of example, for one particular implementation using a light field in the form of a laser pulse of many photons, Bell pairs are created with fidelities of 0.77 or 0.638 for 10 km and 20 km distances respectively between qubits, and the creation succeeds on thirty eight to forty percent of the attempts. The main point is that the entanglement operation depicted in FIG. 1A is distance limited; for simplicity, in the following a probability of success of 0.25 is assumed at a distance of 10 km.

Figure 2:
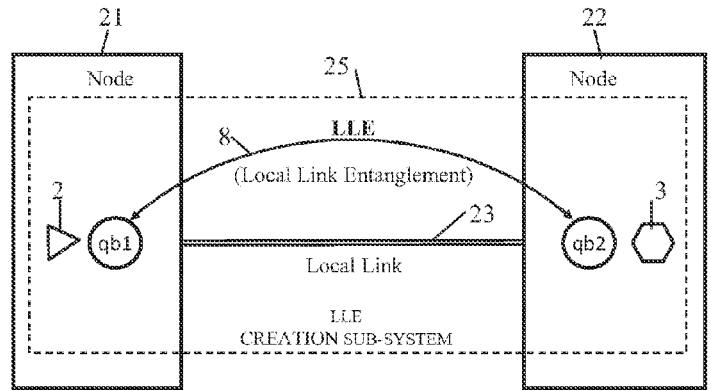
FIG. 2 is a diagram depicting an entanglement creation subsystem for carrying out an entanglement operation between two qubits located in respective, spaced, nodes.

LLE Creation Subsystem (FIG. 2)

An assembly of components for carrying out an entanglement operation is herein referred to as an "entanglement creation subsystem" and may be implemented locally within a piece of apparatus or between remotely located pieces of apparatus (generally referred to as nodes). FIG. 2 depicts an example of the latter case where two nodes 21 and 22 are optically coupled by an optical fibre 23; optical fibres, such as the fibre 23, providing a node-to-node link are herein called "local link" fibres. The nodes 21, 22 of FIG. 2 include components for implementing respective qubits qb1 and qb2 (for ease of understanding, the same qubit designations are used in FIG. 2 as in FIG. 1A). The qubits qb1 and qb2, together with an emitter 2 associated with qb1, a detector 3 associated with qb3, the local link fibre 23 and entanglement-operation control logic in each node (not shown), form an entanglement creation subsystem 25 for creating an entanglement 8 between qubits qb1 and qb2. An entanglement of this sort created by a light field passed across a local link fibre between nodes is herein called a "local link entanglement" or "LLE"; the node-spanning entanglement creation subsystem 25 is correspondingly called an "LLE creation subsystem".

Figure 1B:
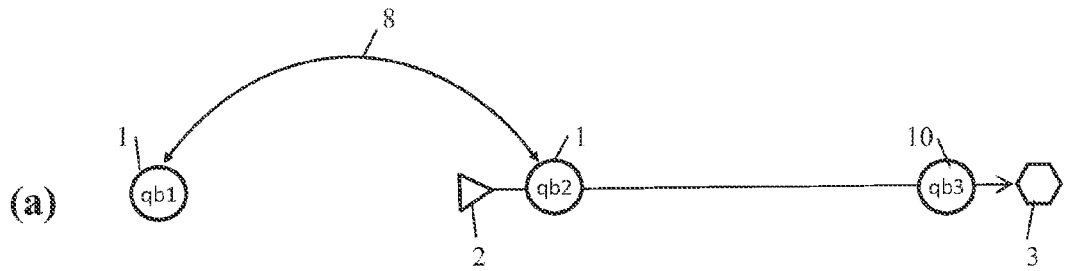
FIG. 1B is a diagram depicting an elongate operation for extending an existing entanglement to create a new entanglement involving one of the originally-entangled qubits and a new qubit.
Figure 1B:
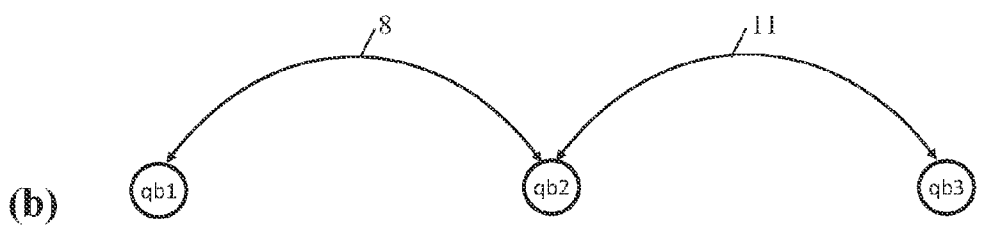
Figure 1B:
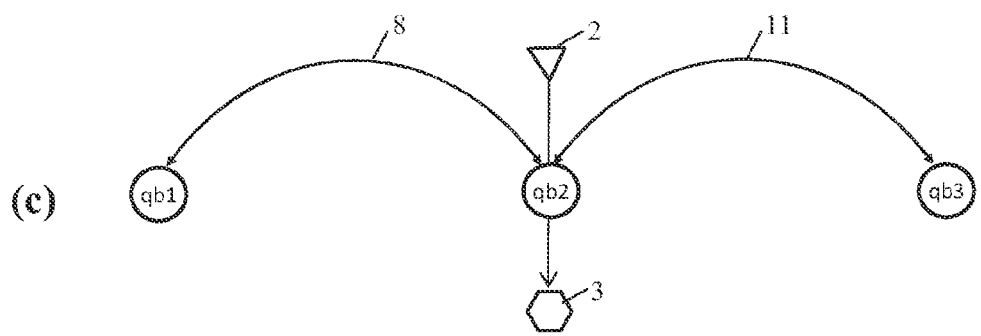
Figure 1B:
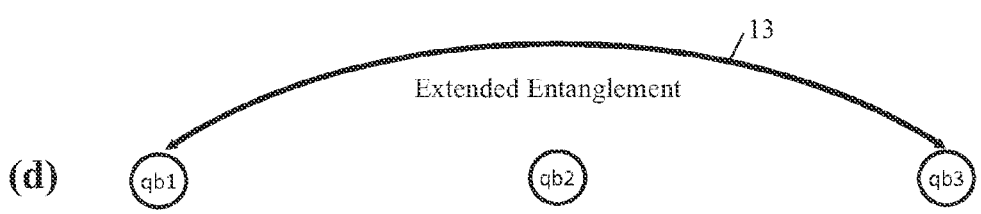

Elongate Operation (FIG. 1B)

Figure 1C:
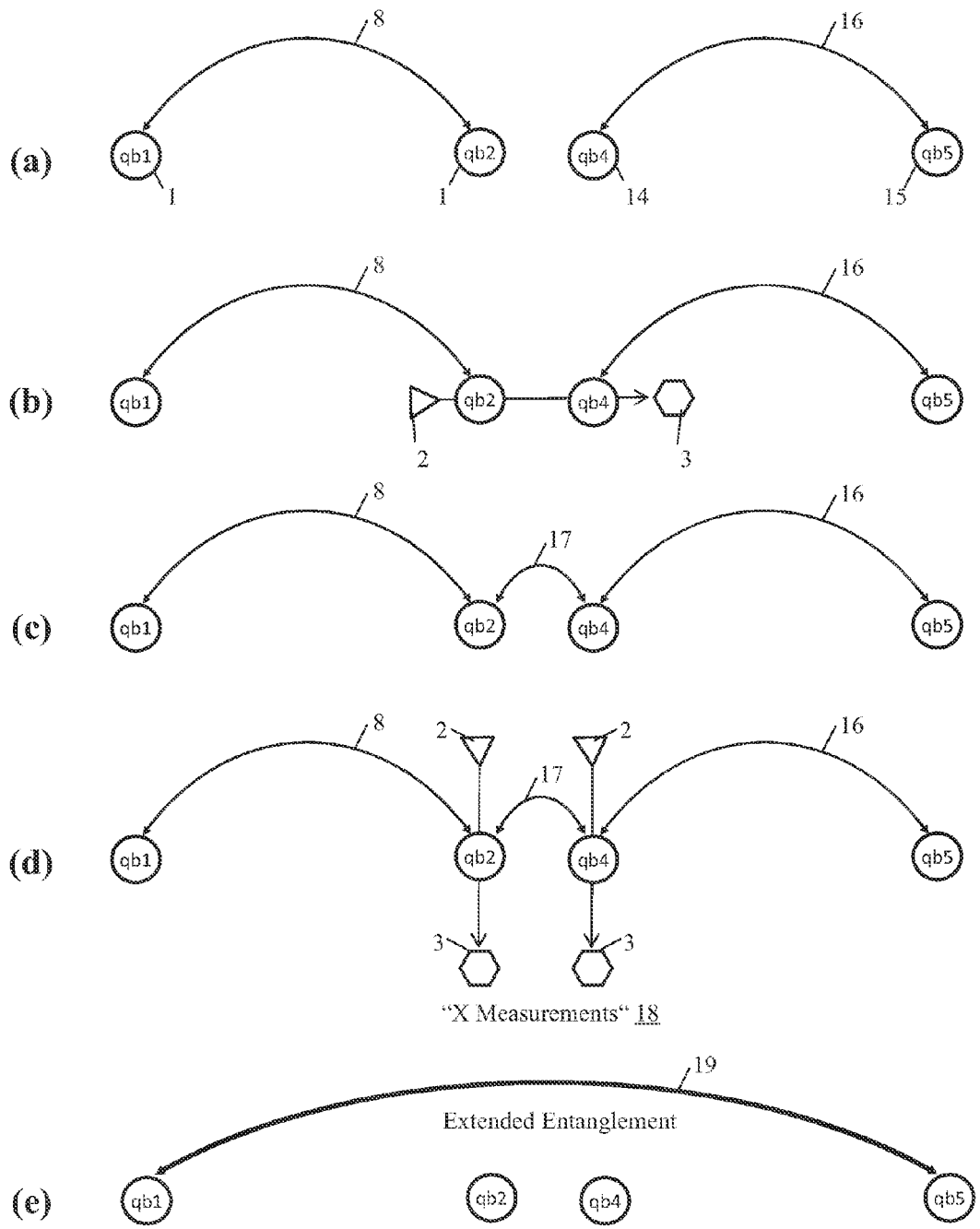
FIG. 1C is a diagram depicting a merge operation for extending an existing entanglement by merging it with another entanglement to create a new entanglement involving one qubit from each of the original entanglements.

An entanglement such as created by a FIG. 1A entanglement operation can be 'extended' to create a new entanglement involving one of the originally-entangled qubits and a new qubit, the latter typically being located at a greater distance from the involved, originally-entangled qubit than the other originally-entangled, qubit. FIGS. 1B and 1C illustrate two ways of extending an initial entanglement 8 between qubits qb1 and qb2 (referenced 1) to form an entanglement between qubit qb1 and another qubit; both ways involve the passing of light fields through various qubits followed by measurement of the light fields but, for simplicity, the light fields themselves and the optical fibres typically used to channel them have been omitted, from FIGS. 1B and 1C.

FIG. 1B illustrates, by way of a time series of snapshots (a) to (d), an entanglement extension process that is herein referred to as an "elongate operation". In general terms, an elongate operation involves further entangling a qubit of an existing first entanglement with a qubit that is not involved in the first entanglement (though it may already be involved in a different entanglement) to form a linked series of entanglements from which the intermediate qubit (that is, the qubit at the end of the first entanglement being extended) is then removed by measurement to leave an 'extended' entanglement between the remaining qubit of the first entanglement and the newly entangled qubit. FIG. 1B illustrates an elongate operation for the simplest case where the qubit that is not involved in the first entanglement is not itself already entangled. More particularly, as shown in snapshot (a) of FIG. 1B, qubit qb2 of an existing entanglement 8 involving qubits qb1 and qb2 (both referenced 1), is farther entangled with a qubit qb3 (referenced 10) by means of an entanglement operation. This entanglement operation involves a light field, emitted by an emitter 2, being passed through qubits qb2 and qb3 before being measured by a detector 3. Snapshot (b) depicts the resulting entanglement 11 between qb2 and qb3. The entanglements 8 and 11 form a linked series of entanglements—which is another way of saying that the states of qb1, qb2 and qb3 are now entangled with each other. A particular type of measurement, herein an "X measurement" (referenced 12 in FIG. 1B), is then effected on the intermediate qubit qb2 by sending a light field from an emitter 2 through qb2 and detecting it with a detector 3, thereby to eliminate qb2 from entanglement with qb1 and qb3 (see snapshot (c)) leaving qb1 and qb3 entangled. A characteristic of the X measurement 12 is that it is done in a manner so as to give no information about the rest of the quantum state of entangled qubits qb1 and qb3; for example, for a joint state between qubits qb1, qb2 and qb3 like "a|000>+b|111>" where a and b are probability amplitudes, an X measurement on qubit qb2 would give a state for the entanglement between qb1 and qb3 of either "a|00>+b|11>" (for an X measurement result of +1) or "a|00>−b|11" (for an X measurement result of −1). This measurement does not give any information about a or b.

After the X measurement 12 has been made to eliminate qb2 from entanglement, an extended entanglement is left between qb1 and qb3—this extended entanglement is depicted as medium thick arc 13 in snapshot (d) of FIG. 1B.

The parity of the extended entanglement 13 is a combination of the parities of the entanglements 8 and 11 and a conjugate qubit parity value determined from the X measurement (in the above example, the X measurement gives either a +1 or −1 result—this sign is the conjugate qubit parity value). Where qubit parity value information and conjugate qubit parity value information are each represented by binary values '0' and '1' for even and odd parity respectively, the qubit parity value information and conjugate qubit parity value information of the extended entanglement are respective XOR (Exclusive OR) combinations of the corresponding component parities.

It may be noted that a functionally equivalent result to the FIG. 1B elongate operation can be obtained by first entangling qb3 with qb2 by means of an entanglement operation in which the mediating light field passes first through qb3, and then removing qb2 from entanglement by effecting an X measurement on it. In the present specification, for linguistic clarity, reference to an 'elongate operation' (with its integral X measurement) only encompasses the case where the initial entanglement performed as part of the elongate operation is effected by a light field first passing through a qubit of the entanglement being extended; the above described functional equivalent to the elongate operation is treated as being separate entanglement and X measurement operations.

Where the objective is to set up an entanglement between two qubits spaced by a substantial distance, the elongate operation described above with reference to FIG. 1B is not that useful by itself. This is because should the component entanglement operation (see (a) of FIG. 1B) fail, then the pre-existing entanglement that is being extended (entanglement 8 in FIG. 1B) will be destroyed. In effect, the probability of successfully creating the extended entanglement 13 is the product of the success probabilities of the entanglement operations used to create entanglements 8 and 11. As already noted, the probability of a successful entanglement operation is distance related so the chances of successfully creating an entanglement over long distances using only elongate operations to successively extend an initial entanglement, are poor. The same problem exists with the described functional equivalent of the elongate operation.

Merge Operation (FIG. 1C)

A better approach is to use the merge operation illustrated in FIG. 1C to knit together independently created entanglements that individually span substantial distances; this approach effectively decouples the success probabilities associated with the individual entanglements as a failure of one attempt to create such an entanglement does not destroy the other entanglements. Of course, to be useful, the merge operation used to join the individual entanglements must itself be highly reliable and this is achieved by carrying it out over extremely short distances.

FIG. 1C illustrates, by way of a time series of snapshots (a) to (e), an example embodiment of a merge operation for 'extending' an entanglement 8 existing between qubits qb1 and qb2 by merging it with another entanglement 16 that exists between qubits qb4 (referenced 14) and qb5 (referenced 15), in order to end up with an 'extended entanglement' between qb1 and qb5 (medium thick arc 19 in FIG. 1C). The qubits qb2 and qb4 are located in close proximity to each other (typically within tens of millimeters). The order in which the entanglements 8 and 16 are created is not relevant (indeed they could be created simultaneously); all that is required is that both entanglements exist in a usable condition at a common point in time. At such a time, the entanglements 8 and 16 are "merged" by a quantum operation carried out locally on qubits qb2 and qb4. (Where the quantum states of qubits qb2, qb4 have been transferred from electron spin to nuclear spin immediately following the creation of the LLEs 8, 16 respectively, these states need to be transferred back to electron spin before the merge operation is effected). The local merge operation involves a first process akin to that of FIG. 1A entanglement operation effected by passing a light field, emitted, by an emitter 2, successively through the two qubits qb2 and qb4, or vice versa, and then measuring the light field (see snapshot (b) of FIG. 1C). This first process, if successful, results in the qubits qb2 and qb4 becoming entangled (as indicated by entanglement 17 in snapshot (c) of FIG. 1C) creating a linked series of entanglements by which qubits qb1 and qb5 are entangled with each other. A second measurement process comprising one or more X measurements 18 (see snapshot (d) of FIG. 1C) is then used to remove the intermediate qubits qb2 and qb4 from the entangled whole leaving an 'extended' entanglement 19 between the qubits qb1 and qb5 The qubits qb2 and qb4 finish up neither entangled with each other nor with the qubits qb1, qb5. Because the merge operation is a local operation between two co-located qubits, the probability of success is very high.

The measurements made as part of the merge operation provide both an indication of the success or otherwise of the merge, and an indication of the "generalized parity" of the merge operation. For example, the first merge-operation process may measure a qubit parity value and the second merge-operation process, the conjugate qubit parity value. In this case, the second process can be effected either as a single X measurement using a light field passed through both qubits qb2 and qb4 (in which case the light field has a different value to that used in the first process e.g. 0,+1 as opposed to 0,−1), or as individual X measurements, subsequently combined, made individually on qb2, and qb4, the latter approach being depicted, in FIG. 1C. The parity of the extended entanglement 19 will be a combination of the parities of the entanglements 8 and 15 and the parity of the merge operation. As before, where qubit parity value information and conjugate qubit parity value information are each represented by binary values '0' and '1' for even and odd parity respectively, the qubit parity value information and conjugate qubit parity value information of the extended entanglement are respective XOR (Exclusive OR) combinations of the corresponding component parities.

Information about the success or otherwise of the merge operation is passed in classical messages to the end qubit locations as otherwise these locations do not know whether the qubits qb1, qb5 are entangled; alternatively since the failure probability of a merge operation is normally very low, success can be assumed and no success/failure message sent—in this case, it will be up to applications consuming the extended entanglement 19 to detect and compensate for merge failure leading to absence of entanglement. As the parity of the extended entanglement will normally need to be known to make use of the entangled qubits, parity information needed to determine the parity of the extended entanglement 19 is also passed on to one or other of the end qubit locations.

It will be appreciated that the form of merge operation described above with respect to FIG. 1C is effectively an elongate operation carried out over a very short distance between qb2 and qb4 to extend entanglement 8, together with an X measurement on qb4 to remove it from entanglement (qb2 having been removed from entanglement by the X measurement performed as part of the elongate operation). Of course, unlike the FIG. 1B example elongate operation where the qubit qb3 to which the entanglement 8 is being extended is not itself already entangled, the equivalent qubit qb4 in FIG. 1C is already involved in a second entanglement 16; however, as already noted, an elongate operation encompasses this possibility.

As already noted, the merge operation is a local operation (between qubits qb2 and qb3 in FIG. 1C) that is effected over a very short distance and thus has a high probability of success. A merge operation takes of the order of $10^{-9}$ secs.

Figure 3A:
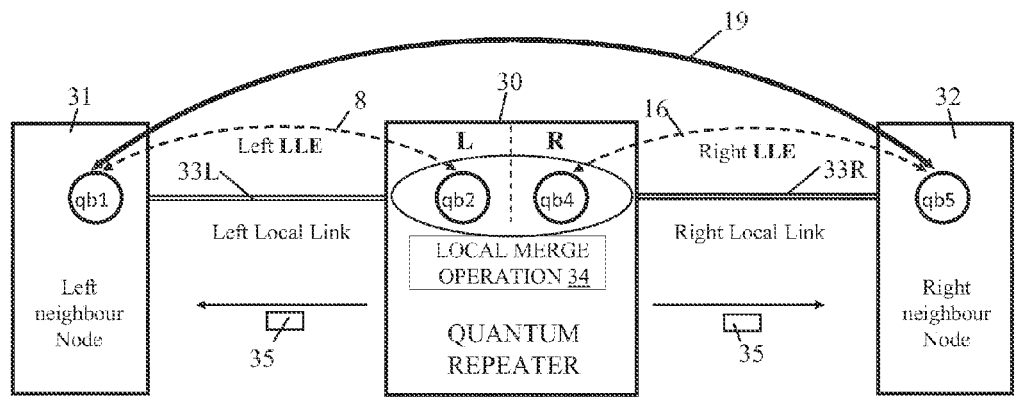
FIG. 3A is a diagram depicting how a quantum repeater can be used to create an entanglement between two qubits over a distance greater than that possible using the FIG. 1A entanglement operation alone.
Figure 3B:
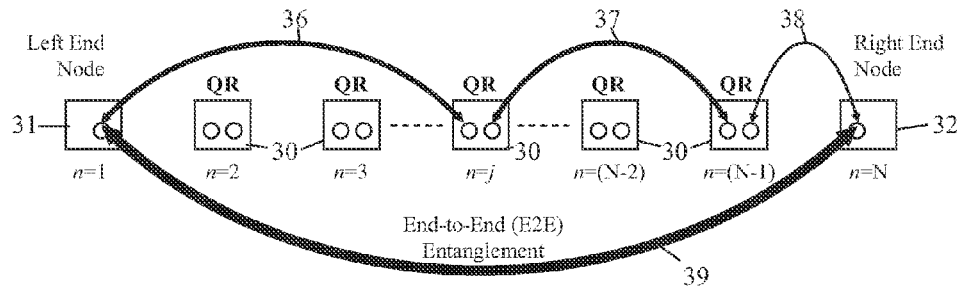
FIG. 3B is a diagram illustrating how a chain of quantum repeaters, can be used to create an extended entanglement between any arbitrarily spaced pair of nodes.

Quantum Repeater (FIGS. 3A & 3B)

In practice, when seeking to create an extended entanglement between two qubits which are located in respective end nodes separated by a distance greater than that over which a basic entanglement operation can be employed with any reasonable probability of success, one or more intermediate nodes, called quantum repeaters, are used to merge basic entanglements that together span the distance between the end nodes. Each quantum repeater node effectively implements a merge operation on a local pair of qubits that correspond to the qubits qb2 and qb4 of FIG. 1C and are involved in respective entanglements with qubits in other nodes. FIG. 3A depicts such a quantum repeater node 30 forming one node in a chain (sequential series) of nodes terminated by left and right end nodes 31 and 32 that respectively accommodate the qubits qb1, qb5 it is desired to entangle (but which are too far apart to entangle directly using an entanglement operation). In the present example, the chain of nodes comprises three nodes with the left and right end nodes 31, 32 also forming the left and right neighbour nodes of the quantum repeater 30. The quantum repeater 30 is connected to its left and right neighbour nodes 31, 32 by left and right local link optical fibres 33L and 33R respectively. It is to be noted that the terms "left" and. "right" as used throughout the present specification are simply to be understood as convenient labels for distinguishing opposite senses (directions along; ends of; and the like) of the chain of nodes that includes a quantum repeater.

The quantum repeater 30 effectively comprises left and right portions or sides (labeled "L" and "R" in FIG. 3A) each comprising a respective qubit qb2, qb4 (for ease of understanding, the same qubit designation are used in FIG. 3A as in FIG. 1C). The qubit qb1 of the left neighbour node 31 and qb2 of the quantum repeater node 30 are part of a LLE creation subsystem formed between these nodes and operative to create a left LLE 8 (shown as a dashed arrowed arc 8 in FIG. 3A) between qb1 and qb2. Similarly, the qubit qb5 of the right neighbour node 32 and qb4 of the quantum repeater node 30 are part of a LLE creation subsystem formed between these nodes and operative to create a right LLE 16 between qb5 and q4.

It may be noted that the direction of travel (left-to-right or right-to-left) of the light field used, to set up each LLE is not critical whereby the disposition of the associated emitters and detectors can be set as desired. For example, the light fields involved in creating LLEs 8 and 16 could both be sent out from the quantum repeater 30 meaning that the emitters are disposed in the quantum repeater 30 and the detectors in the left and right neighbour nodes 31, 32. However, to facilitate chaining of quantum repeaters of the same form, it is convenient if the light fields all travel in the same direction along the chain of nodes; for example, the light fields can be arranged ail to travel from left to right in which case the left side L of the quantum repeater 30 will include the detector for creating the left LLE 8 and the right side R will include the emitter for creating the right LLE 16. For simplicity, and unless otherwise stated, a left-to-right direction of travel of the light field between the nodes will be assumed hereinafter unless otherwise stated: the accompanying Claims are not, however, to be interpreted as restricted to any particular direction of travel of the light field, or to the direction of travel being the same across different links, unless so stated, or implicitly required.

In operation of the quantum repeater 30, after creation, in any order, of the left and right LLEs 8 and 16, a local merge operation 34 involving the qubits qb2 and qb4 is effected thereby to merge the left ILL 8 and the right LLE 16 and form extended entanglement 19 between the qubits qb1 and qb5 in the end nodes 31 and 32 respectively.

If required, information about the success or otherwise of the merge operation and about parity is passed in classical messages 35 from the quantum repeater 30 to the nodes 31, 32.

Regarding the parity information, where the parity of the local link entanglements has been standardized (by qubit state flipping as required), only the merge parity information needs to be passed on by the quantum repeater and either node 31 or 32 can make use of this information. However, where LLE parity information has simply been stored, then the quantum repeater needs to pass on whatever parity information it possesses; for example, where the parities of the left and right LLEs 8, 16 are respectively known by the quantum repeater 30 and the node 32, the quantum repeater 30 needs to pass on to node 32 both the parity information on LLE 8 and the merge parity information, typically after combining the two. Node 32 can now determine the parity of the extended entanglement by combining the parity information it receives from the quantum repeater 30 with the parity information it already knows about LLE 16.

From the foregoing, it cars be seen that although the merge operation itself is very rapid (of the order of $10^{-9}$ seconds), there is generally a delay corresponding to the message propagation time to the furthest one of the nodes 31, 32 before the extended entanglement 19 is usefully available to these nodes.

By chaining together multiple quantum repeaters, it is possible to create an extended entanglement between any arbitrarily spaced pair of nodes. FIG. 3B illustrates this for a chain of N nodes comprising left and right end nodes 31 and 32 respectively, and a series of (N−2) quantum repeaters 30 (each labeled "QR" and diagrammatically depicted for simplicity as a rectangle with two circles that represent L and R qubits). The nodes 30-32 are interconnected into a chain by optical fibres (not shown) and are numbered from left to right—the number n of each node is given beneath each node and node number "j" represents an arbitrary QR node 30 along the chain. The node number of a QR node can be used as a suffix to identify the node; thus "$QR_j$" is a reference to the quantum repeater node numbered j. This node representation, numbering and identification is used generally throughout the present specification.

In FIG. 3B, three existing entanglements 36, 37, and 38 are shown between qubits in respective node pairings; for convenience, when referring at a high level to entanglements along a chain of nodes, a particular entanglement will herein be identified by reference to the pair of nodes holding the qubits between which the entanglement exists, this reference taking the form of a two-element node-number tuple. Thus, entanglement 38, which is a local link entanglement LLE between qubits in the neighbouring nodes numbered (N−1) and N, is identifiable by the node number tuple {(N−1), N}. Entanglements 36 and 37 (shown by medium thick arcs in FIG. 3B) are extended entanglements existing between qubits in the node pairings {1, j} and {j, (N−1)} respectively, these entanglements having been created by the merging of LLEs. To create an end-to-end (abbreviated herein to "E2E") entanglement between qubits in the left and right end nodes 31, 32 (see thick arc 39 in FIG. 3), entanglements 36 and 37 can first be merged by $QR_j$ with the resultant extended entanglement then being merged with LLE 38 by $QR_{(N-1)}$; alternatively, entanglements 37 and 38 can first be merged by $QR_{(N-1)}$ with the resultant extended entanglement then being merged with entanglement 36 by $QR_j$.

Entanglement Build Path

The "entanglement build path" (EBP) of an entanglement is the aggregate qubit-to-qubit path taken by the mediating light field or fields used in the creation of an un-extended or extended entanglement; where there are multiple path segments (that is, the path involves more than two qubits), the light fields do not necessarily traverse their respective segments in sequence as will be apparent from a consideration of how the FIG. 3B E2E entanglement is built (in this example, the entanglement build path is the path from one end node to the other via the left and right side qubits of the chain of quantum repeaters).

Representation of Low Level Quantum Physical Hardware

The particular form of physical implementation of a qubit and the details of the methods of performing entanglement, elongate, and merge operations (for example, whether very weak amounts of light or laser pulses of many photons are used) are not of direct relevance to the present invention and accordingly will not be further described herein, it being understood that appropriate implementations will be known to persons skilled in the art. Instead, the physical hardware for implementing the quantum operations (the "quantum physical hardware") will be represented in terms of a basic block, herein called a "Q-block", that provides for the implementation of, and interaction with, one qubit, and an associated optical fabric.

Figure 4:
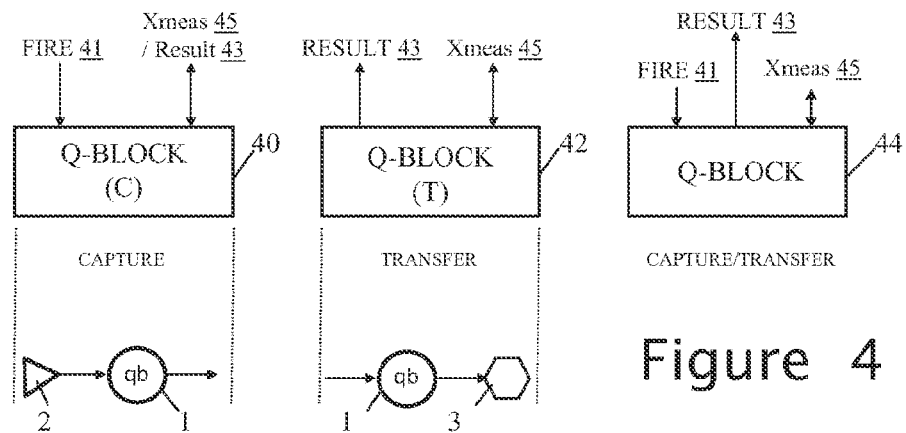
FIG. 4 is a diagram illustrating three varieties of a basic quantum physical hardware block, herein a "Q-block", for carrying out various quantum interactions.

FIG. 4 depicts three varieties of Q-block, respectively referenced 40, 42 and 44.

Q-block variety 40 represents the physical hardware needed to manifest a qubit and carry out the "Capture" interaction of FIG. 1A with that qubit, that is, the controlled sending of a light field through the qubit in a prepared state. This variety of Q-block—herein called "a Capture Q-block" (abbreviated in the drawings to "Q-block (C)")—comprises a physical implementation of a qubit 10 and a light-field emitter 12, together with appropriate optical plumbing, functionality for putting the qubit in a prepared state and for shuttering it (for example, using an electro-optical shutter) except when a light field is to be admitted, functionality (where appropriate for the qubit implementation concerned) for transferring the qubit state between electron spin and nuclear spin (and vice versa) as needed, and control functionality for coordinating the operation of the Capture Q-block to send a light field through its qubit (and on out of the Q-block) upon receipt of a "Fire" signal 41.

Q-block variety 42 represents the physical hardware needed to manifest a qubit and carry out the "Transfer" interaction of FIG. 1A with that qubit, that is, the passing of a received light field through the qubit in a prepared state followed by measurement of the light field. This variety of Q-block—herein called, "a Transfer Q-block" (abbreviated in the drawings to "Q-block (T)")—comprises a physical implementation of a qubit 10 and a light-field detector 13, together with appropriate optical plumbing, functionality (responsive, for example to a herald light pulse 6) for putting the qubit in a prepared state and for shuttering it except when a light field, is to be admitted, functionality (where appropriate for the qubit implementation concerned) for transferring the qubit state between electron spin and nuclear spin (and vice versa) as needed, and control functionality for coordinating the operation of the Transfer Q-block and for outputting the measurement results 43.

Q-block variety 44 is a universal form of Q-block that incorporates the functionality of both of the Capture and Transfer Q-block varieties 40 and 42 and so can be used to effect both Capture and Transfer interactions. For convenience, this Q-Block variety is referred to herein simply as a "Q-block" without any qualifying letter and unless some specific point is being made about the use of a Capture or Transfer Q-block 40, 42, this is the variety of Q-block that will be generally be referred to even though it may not in fact be necessary for the Q-block to include both Capture and Transfer interaction functionality in the context concerned—persons skilled in the art will have no difficulty in recognizing such cases and in discerning whether Capture or Transfer interaction functionality is required by the Q-block in its context. One reason not to be more specific about whether a Q-block is of a Capture or Transfer variety is that often either variety could be used provided that a cooperating Q-block is of the other variety (the direction of travel of light fields between them not being critical).

Regardless of variety, every Q-block will be taken to include functionality for carrying out an X measurement in response to receipt of an Xmeas signal 45 thereby enabling the Q-block to be used in elongate and merge operations; the X measurement result is provided in the Result signal 43, it being appreciated that where the Q-block has Transfer interaction functionality, the X measurement functionality will typically use the detector 2 associated with the Transfer interaction functionality. X measurement functionality is not, of course, needed for an entanglement operation and could therefore be omitted from Q-blocks used only for such operations.

It may be noted that where there are multiple Q-blocks in a node, the opportunity exists to share certain components between Q-blocks (for example, where there are multiple Q-blocks with Capture interaction functionality, a common light-field, emitter may be used for all such Q-blocks). Persons skilled in the art will appreciate when such component sharing is possible.

An entanglement operation will involve a Q-block with Capture interaction functionality (either a Transfer Q-block 40 or a universal Q-block 44) optically coupled to a Q-block with Transfer interaction functionality (either a Transfer Q-block 42 or a universal Q-block 44), the entanglement operation being initiated by a Fire signal 41 sent to the Q-block with Capture interaction functionality and the success/failure of the operation being indicated in the result signal 43 output by the Q-block with Transfer interaction functionality.

Where an elongate operation is to be effected, the initial entanglement-operation component of the elongate operation will also involve a Q-block with Capture interaction functionality and a Q-block with Transfer interaction functionality. The provision of X measurement functionality in all varieties of Q-block enables the subsequent removal from entanglement of the intermediate qubit to be effected by sending an Xmeas signal to the Q-block implementing this qubit, the measurement results being provided in the result signals 43 output by this Q-block.

Where a merge operation is to be effected, this will also involve a Q-block with Capture interaction functionality and a Q-block with Transfer interaction functionality. Again, the provision of X measurement functionality in all varieties of Q-block enables the removal from entanglement of the qubit(s) involved in the merge operation. Measurement results are provided in the result signals 43 output by the appropriate Q-blocks.

Figure 5:
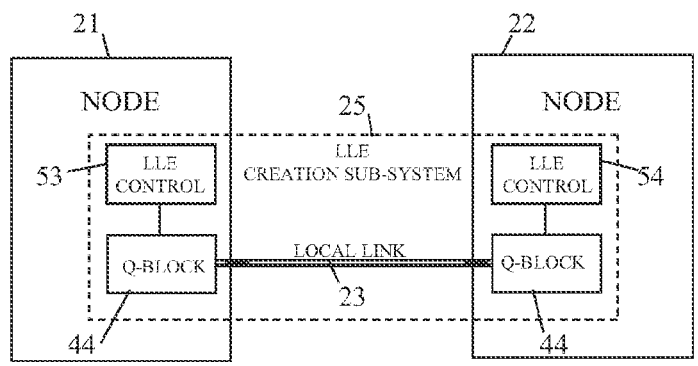
FIG. 5 is a diagram illustrating an implementation of the FIG. 2 entanglement creation subsystem using Q-blocks.

FIG. 5 depicts the FIG. 2 LLE creation subsystem 25 as implemented using respective Q-blocks 44. A respective Q-block 44 is provided in each node 21 and 22, these Q-blocks 44 being optically coupled through the local link fibre 23. Each Q-block 44 has associated control logic formed by LLE control unit 53 in node 21 and LLE control unit 54 in node 54, 53, Because the Q-blocks 44 depicted, in FIG. 5 are of the universal variety, the direction of travel along the local link fibre 23 of light fields involved in entanglement creation is not tied down; thus, the Q-block 44 of the node 21 could serve as a Capture Q-block and that of node 22 as a Transfer Q-block or the Q-block 44 of the node 21 could serve as a Transfer Q-block and that of node 51 as a Capture Q-block.

In the LLE creation subsystem 25 of FIG. 5, the single Q-blocks 44 are simply coupled directly to the local link fibre 23. However, in many cases there will be a need to provide a controllable optical fabric in a node to appropriately guide light fields to/from the Q-block(s) of the node depending on its current operational requirements. For example, where there are multiple Q-blocks in anode sharing the same external fibre, an optical fabric may be required to merge outgoing light fields onto the common fibre or direct incoming light fields from the fibre to selected Q-blocks; in another example, an optical fabric may be required in a quantum repeater node (such as node 30 in FIG. 3A) to switch a L-side Q-block and a R-side Q-block from optically interfacing with respective left and right local link fibres for LLE creation, to optically interfacing with each other for a local merge operation.

Figure 6:
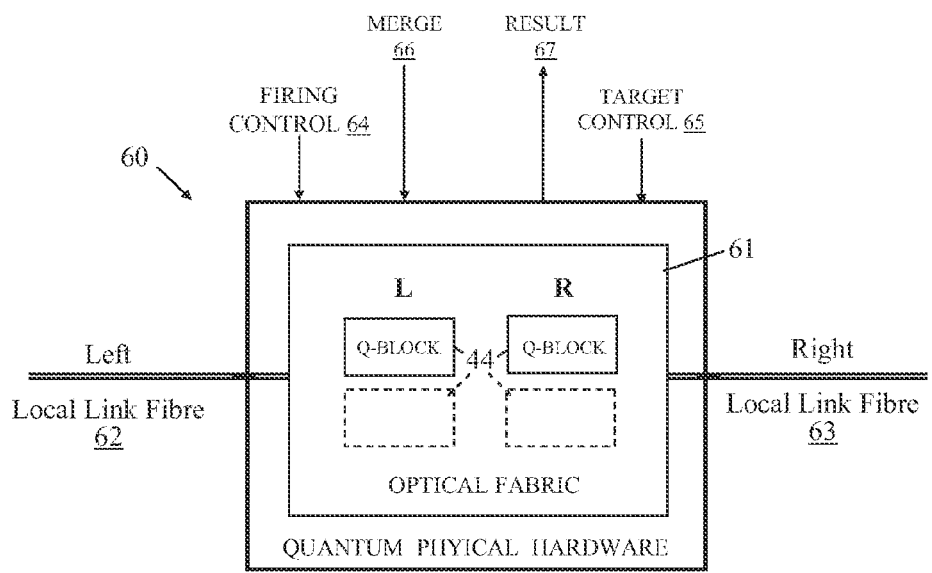
FIG. 6 is a generic diagram of quantum physical hardware of a quantum repeater.

In general terms, therefore, the quantum physical hardware of a node, that is, the physical elements that implement and support qubits and their interaction through light fields, comprises not only one or more Q-blocks but also an optical fabric in which the Q-block(s) are effectively embedded. By way of example, FIG. 6 depicts such a representation for a quantum repeater node; thus, quantum physical hardware 60 is shown as comprising an optical fabric 61 for guiding light fields to/from the Q-blocks 44 and the Q-blocks 44 are depicted as existing within the optical fabric 61 with the local link fibres 62, 63 coupling directly to the optical fabric. One L-side and one R-side Q-block are shown in solid outline and possible further L-side and R-side Q-blocks are indicated by respective dashed-outline Q-blocks.

As employed herein, any instance of the above-described generalized quantum physical hardware representation (such as the instance shown in FIG. 6 in respect of a quantum repeater), is intended to embrace all possible implementations of the quantum physical hardware concerned, appropriate for the number and varieties of Q-blocks involved and their intended roles. (It may be noted that although FIG. 6 shows the Q-blocks as Q-blocks 44—that is, of the Universal variety—this is simply to embrace all possible implementations and is not a requirement of the role being played, by the Q-blocks in the quantum repeater; a particular implementation may use other varieties of Q-blocks as appropriate to their roles. This use of Q-blocks 44 in the above-described generalized quantum physical hardware representation is not limited to the FIG. 6 representation of quantum physical hardware for a quantum repeater).

Depending on the quantum operations to be performed by the quantum physical hardware, the latter is arranged to receive various control signals and to output result signals, In the case of the FIG. 6 quantum physical hardware block 60 appropriate for a quantum repeater, the quantum physical hardware is arranged to receive "Firing Control" and "Target Control" signals 64, 65 for controlling entanglement creation operations, to receive "Merge" signals 67 for controlling merge operations, and to output "Result" signals 66 indicative of the outcome of these operations. The signals 64-67 may be parameterized to indicate particular Q-blocks. Target Control signals are not needed in some quantum repeater embodiments as will become apparent hereinafter. In one implementation of the FIG. 6 quantum physical hardware 60, the Firing Control signals 64 comprise both:

set-up signals for appropriately configuring the optical fabric 61 (if not already so configured) to optically couple one or more Q-block(s) with Capture interaction functionality to one of the local link fibres, and
 the previously-mentioned "Fire" signal(s) for triggering light-field generation by one or more of the Q-block(s) with Capture interaction functionality; and the Target Control signals 65 comprise:
 set-up signals for appropriately configuring the optical fabric 61 (if not already so configured) to optically couple a Q-block with Transfer interaction functionality to one of the local link fibres.

Furthermore, in this implementation, the Merge signals 66 comprise both:
 set-up signals for appropriately configuring the optical fabric 61 (if not already so configured) to effect a merge operation involving a L-side and R-side Q-block of the repeater,
 a "Fire" signal for triggering the first merge-operation process, and
 where the FIG. 1C form of merge operation is being carried out, one or more Xmeas signals to instigate the X measurements that form the second merge-operation process.

For quantum physical hardware intended to perform elongate operations, the quantum physical hardware, as well as being arranged, to receive Firing Control signals (for performing the entanglement creation component of the elongate operation) and to output Result signals, is also arranged to receive Xmeas signals for instigating X measurements whereby to complete the elongate operation.

The optical fabric of a node may have a default configuration. For example, where the FIG. 6 quantum physical hardware 60 only includes one L-side and one R-side Q-block, the optical fabric 61 may be arranged to default to an LLE creation configuration optically coupling the Q-blocks to respective ones of the local link fibres. In this case, the merge signals 66 are arranged to only temporarily optically couple the two Q-blocks to each other for the time needed to carry out a merge operation. In cases such as this, the Target Control signals 65 can be dispensed with entirely and the Firing Control signals 64 simply comprise Fire signals sent to the appropriate Q-block.

General Form of Quantum Repeater Embodiments

Figure 7:
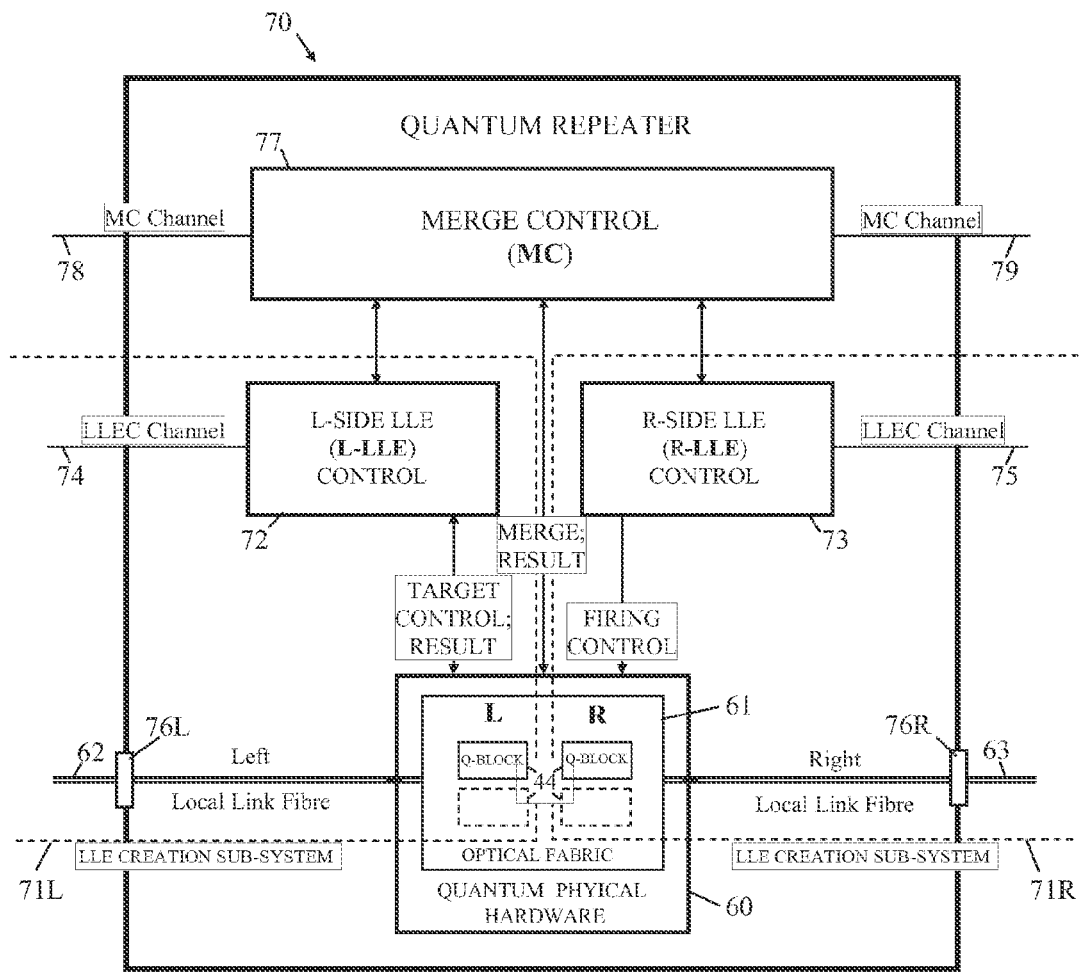
FIG. 7 is a diagram depicting the general form of quantum repeater embodiments of the invention.

FIG. 7 depicts the general form of the quantum repeater embodiments to be described hereinafter.

More particularly, quantum repeater 70 comprises quantum physical hardware 60 of the form described above with respect to FIG. 6 and including one or more L-side and R-side Q-blocks 44, and optical fabric 61 coupled to left and right local link fibres 62, 63 via respective optical interfaces 76L, 76R. As already indicated, for convenience and without limitation, the light fields involved in LLE creation will be taken (unless otherwise stated) as travelling from left to right along the local link fibres between nodes, whereby the R-side Q-block(s) of the FIG. 7 repeater 70 act as Capture Q-block(s) during LLE creation (forming a right-side LLE creation subsystem 71R with L-side Q-block(s) in a right neighbour node, not shown), and the L-side Q-block(s) of the repeater 70 act as Transfer Q-block(s) during LLE creation (forming a left-side LLE creation subsystem 71R with R-side Q-block(s) in a left neighbour node, not shown).

An R-side LLE ("R-LLE") control unit 73 is responsible for generating the Firing Control signals that select (where appropriate) and trigger firing of the R-side Q-block(s) in respect of LLE creation. An L-side LLE ("L-LLE") control unit 72 is responsible for generating, where appropriate, the Target Control signals for selecting the L-side Q-block(s) to participate in LLE creation; the L-LLE control unit 72 is also arranged to receive the Result signals from the quantum physical hardware 60 indicative of the success/failure of the LLE creation operations involving the L-side Q-blocks.

It will thus be appreciated that initiation of right-side LLE creation is effectively under the control of the R-LLE control unit 73 of the repeater 70 (as unit 73 is responsible for generating the Fire signal for the R-side Q-block involved in creating the right-side LLE); initiation of left-side LLE creation is, however, effectively under the control of the R-LLE control unit in the left neighbour node.

An LLE control ("LLEC") classical communication channel 74 inter-communicates the L-LLE control unit 72 with the R-LLEC unit of the left neighbour node (that is, the R-LLE control unit associated with the same LLE creation subsystem 71L as the L-LLE control unit 72); the L-LLEC unit 72 uses the LLEC channel 74 to pass LLE creation success/failure messages (message 15 in FIG. 1) to the R-LLE control unit of the left neighbour node.

An LLE control ("LLEC") classical communication channel 75 inter-communicates the R-LLE control unit 73 with the L-LLE control unit of the right neighbour node (that is, the L-LLE control unit associated with the same LLE creation subsystem 71R as the R-LLE control unit 73); the R-LLE control unit 73 receives LLE creation success/failure messages (message 15 in FIG. 1) over the LLEC channel 75 from the L-LLE control unit of the right neighbour node.

Messages on the LLEC channels 74, 75 are referred to herein as 'LLEC' messages.

It will be appreciated that where the light fields involved in LLE creation are arranged to travel from right to left along the local link fibres between nodes (rather than from left to right), the roles of the L-side and R-side LLE control units 72, 73 are reversed.

A merge control ("MC") unit 77 is responsible for generating the Merge signals that select, where appropriate, local Q-blocks to be merged, and trigger their merging. The MC unit 77 is also arranged to receive from the quantum physical hardware 60, the Result signals indicative of the success/failure and parity of a merge operation.

A merge control ("MC") classical communication channel 78, 79 inter-communicates the MC unit 77 with corresponding units of its left and right neighbour nodes to enable the passing of parity information and, if needed, success/failure information concerning merge operations. Messages on the MC channels 78, 79 are referred to herein as 'MC' messages.

The LLEC communication channel 74, 75 and the MC communication channel 78, 79 can be provided over any suitable high-speed communication connections (such as radio) but are preferably carried as optical signals over optical fibres. More particularly, the LLEC communication channel 74, 75 and the MC communication channel 78, 79 can be carried over respective dedicated optical fibres or multiplexed onto the same fibre (which could be the fibre used for the local links optically coupling Q-blocks in neighbouring nodes—for example, the MC communication channel can be implemented as intensity modulations of the herald signal 79, particularly where only parity information is being sent on this channel). More generally, the LLEC and MC communication channels can be combined into a single duplex classical communications channel.

In the embodiments described hereinafter, the LLEC communication channel 74, 75 is carried by the local link fibres and the MC communication channel 78, 79 is split into a left-to-right ("LR") channel and a right-to-left ("RL") channel, these two MC channels being carried by respective optical fibres distinct from that used for the local links. Messages on the LR MC channel and the RL MC channel are respectively referred to herein as 'LR-MC' messages and 'RL-MC' messages. It will be appreciated that this arrangement of channels and fibres is merely exemplary and other arrangements could alternatively be used.

It may be noted that the end nodes linked by a chain of quantum repeaters will each contain functionality for inter-working with the facing side (L or R) of the neighbouring quantum repeater. Thus, the left end node will include functionality similar to that of the R-side of a quantum repeater thereby enabling the left end node to inter-work with the L-side of the neighbouring repeater, and the right end node will include functionality similar to that of the L-side of a quantum repeater to enable the right end node to inter-work with the R-side of the neighbouring repeater.

With regard to entanglement parity, in the embodiments described below, rather than the parity of entanglements being standardized by qubit state flipping, at each quantum repeater LLE parity information is stored and subsequently combined with merge parity information for passing on along cumulatively to an end node thereby to enable the latter to determine the parity of end-to-end entanglements.

In the following description of the quantum repeater embodiments, the same reference numerals are used for the main repeater components as are used in the generic diagram of FIG. 7, it being understood that the specific implementations of these components will generally differ.

"Synchronized" Quantum Repeater Embodiments

Figure 10:
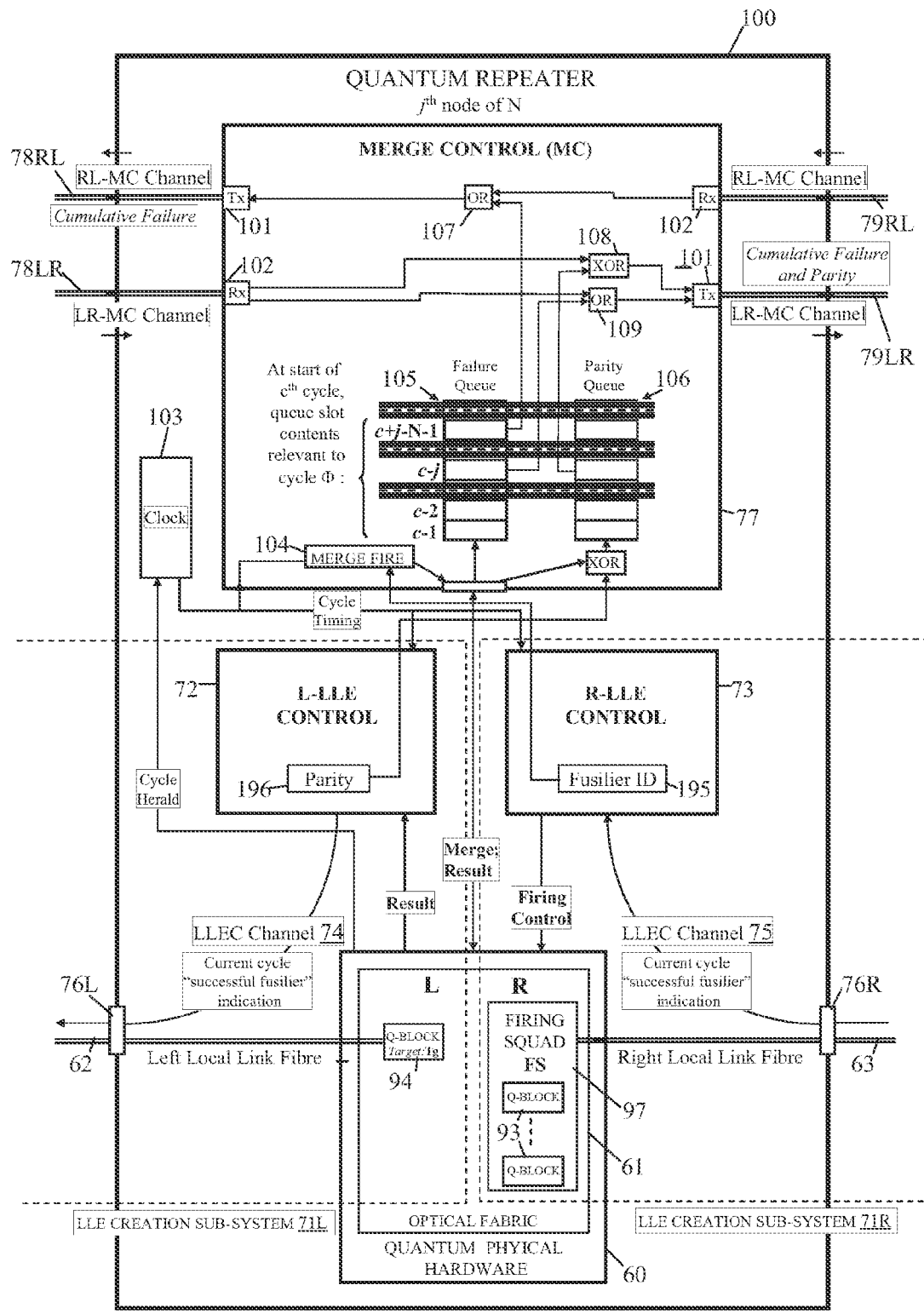
FIG. 10 is a diagram of a first quantum-repeater embodiment, this embodiment basing local-link entanglement creation on subsystems of the FIG. 9 form.
Figure 23:
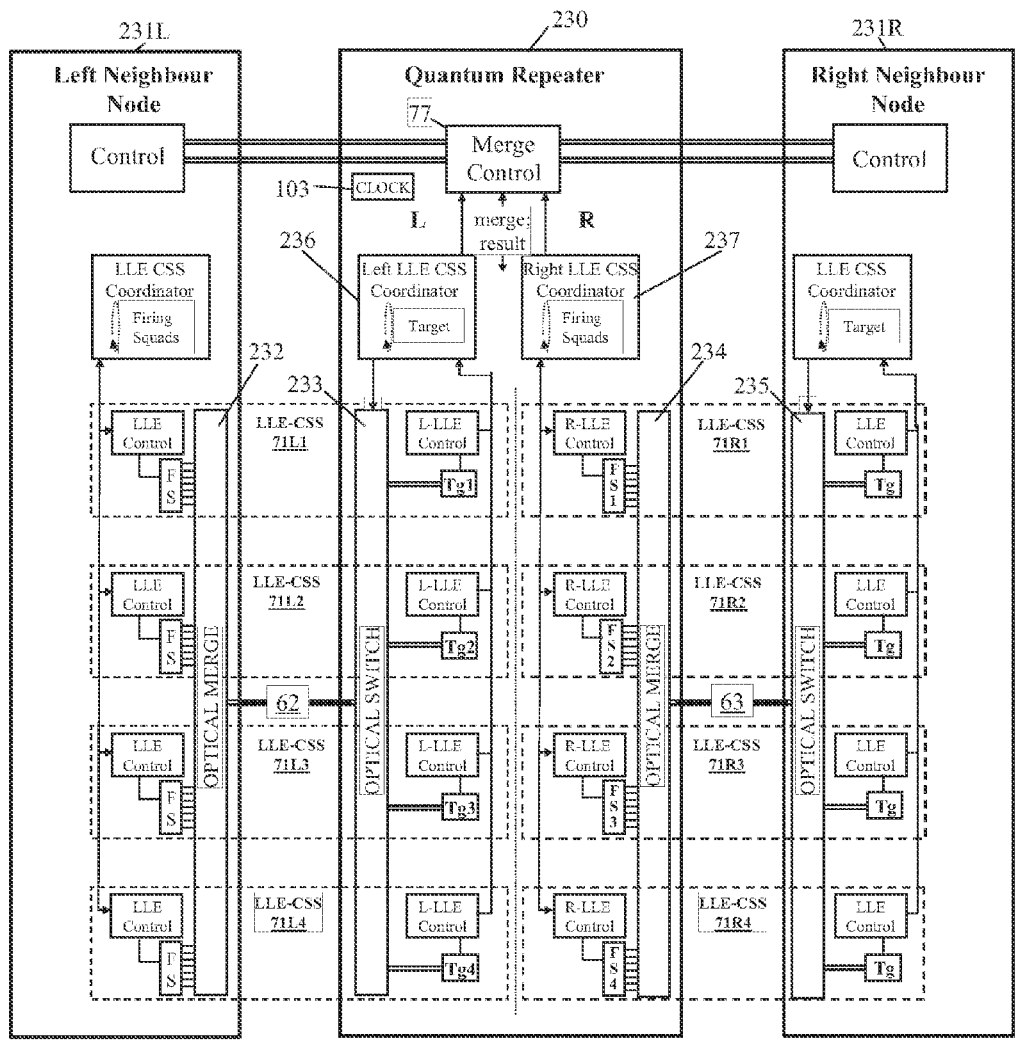
FIG. 23 is a diagram of a second quantum-repeater embodiment in which four parallel local link entanglement creation subsystems are formed with each of its neighbour nodes.

The first and second quantum repeater embodiments, illustrated in FIGS. 10 and 23 respectively, both operate on a "Synchronized" basis to build an end-to-end (E2E) entanglement between qubits in left and right end nodes of a chain of nodes whose intermediate nodes are quantum repeaters. Building an E2E entanglement on the "Synchronized" basis involves all repeaters in a chain of quantum repeaters being time synchronized (for example, by timing taken from a GPS constellation or by phase lock looping clocks in the repeaters by signals sent between them). Also required are reliable LLE creation subsystems between repeaters (in this context, 'reliable' means LLEs can be created with a high probability of being available in successive operating periods).

During each successive synchronized operating cycle of the quantum repeaters, each repeater creates a right-side LLE (or brings into play a previously-created right-side LLE) whereby LLEs are operatively available between all repeaters, and then all the repeaters carry out a merge operation—provided all the merges are successful, the effect is to create an E2E entanglement.

Figure 8:
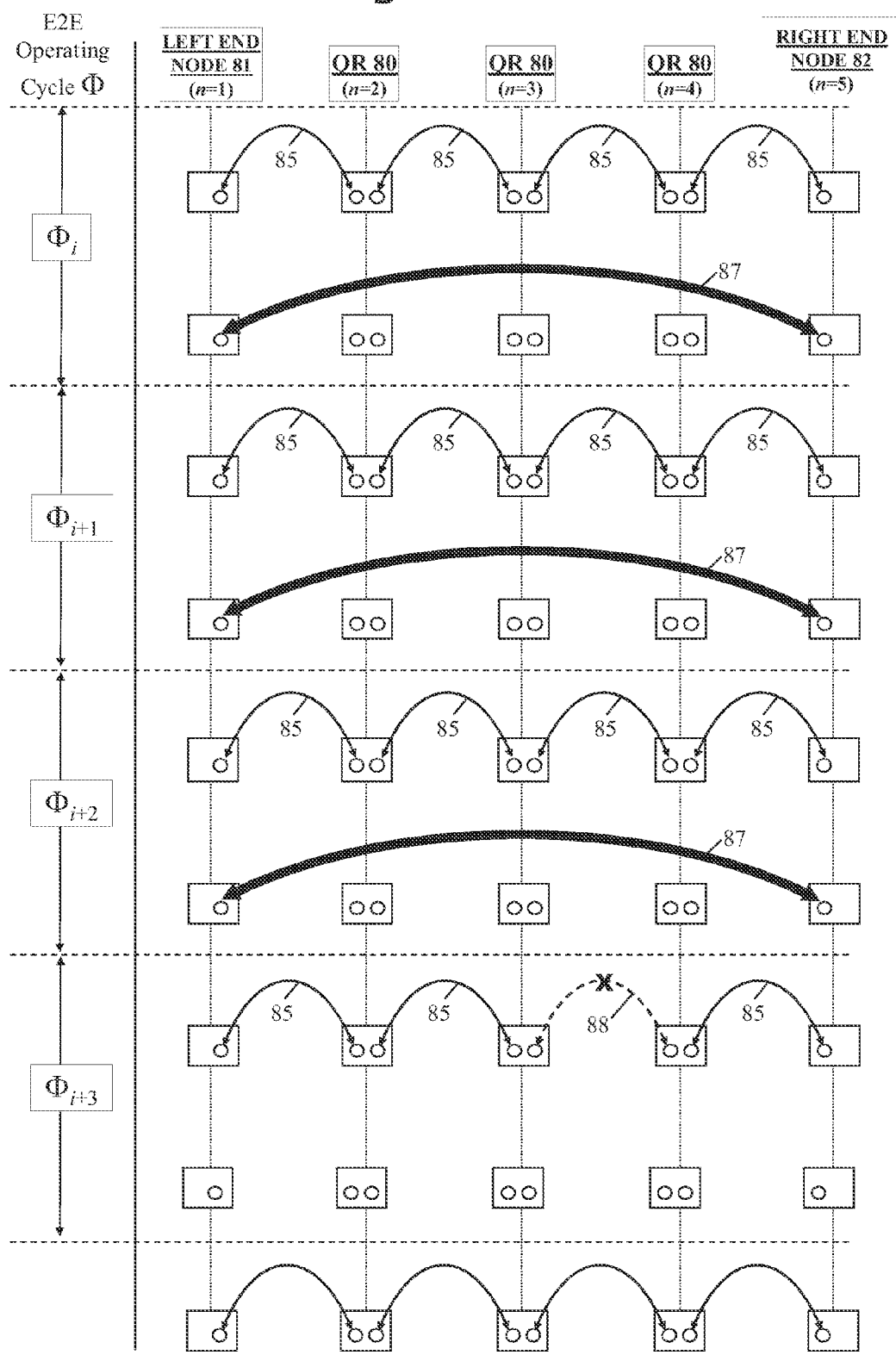
FIG. 8 illustrates four successive operating cycles of a process embodying the invention for creating end-to-end entanglements between end nodes of a chain of five optically-coupled nodes, the intermediate nodes of the chain being quantum repeaters of the FIG. 7 form.

FIG. 8, which uses the same notation as FIG. 3, depicts four successive operating cycles $\Phi$ for a chain of five optically-coupled nodes comprising left and right end nodes 81, 82 and three quantum repeaters 80 ($QR_2$, $QR_3$, $QR_4$); the optical fibres coupling the nodes are omitted for clarity. The four operating cycles are labelled $\Phi_i$ to $\Phi_{i+3}$ respectively. For the first three cycles $\Phi_i$, $\Phi_{i+1}$, $\Phi_{i+2}$, LLEs are successfully created between each pair of neighbour nodes (arched arrows 85), these LLEs then being merged to form an E2E entanglement (thick arched, arrow 87). However, for the fourth cycle $\Phi_{i+3}$, although LLEs are successfully created between the first—second, second—third, and fourth—fifth node pairs, there is a failure to create an LLE between the third, and fourth nodes (crossed-through dashed arrow 88) whereby the merging of LLEs in operating cycle $\Phi_{i+3}$ fails to produce an E2E entanglement.

The operating cycles $\Phi$ referred to above are strictly operating cycles of the node-chain as a whole (referred to below as 'E2E operating cycles') with each cycle encompassing the merging of LLEs established between every pair of neighbour nodes to create one E2E entanglement. Each E2E operating cycle also corresponds time-wise to a top-level operating cycle of each repeater, each such top-level repeater operating cycle generally encompassing one merge operation. Where there exists only a single LLE creation subsystem between each pair of neighbour nodes, the operating cycle of each such LLE creation subsystem (the 'LLE creation subsystem operating cycle') will also correspond time-wise to the E2E operating cycle (and the top-level repeater operating cycle) with LLEs being created between pairs of neighbour nodes at the same rate as E2E entanglements.

However, as will be described hereinafter in relation to the second quantum repeater embodiment, it is possible to provide multiple LLE creation subsystems between each pair of neighbour nodes to increase the rate of LLE creation between nodes and thereby enable E2E entanglements to be created at a correspondingly increased rate effectively shortening the E2E operating cycle (and the top-level repeater operating cycle). In this case, the LLE creation subsystem operating cycle will typically be longer than (and usually an integer multiple of) the E2E operating cycle (and the top-level repeater operating cycle). Quantum repeaters arranged to operate in this manner carry out LLE creation according to a timing determined by the LLE creation subsystem operating cycle but effect merge operations according to a timing determined by the E2E operating cycle. The symbol $\Phi$ is always used herein to refer to the E2E operating cycle.

It may be noted that the overall (as opposed to top-level) operating cycle of a quantum repeater, that is, a cycle of operation starting and ending in substantially the same state for all components of the repeater, will typically correspond time-wise to the LLE creation subsystem operating cycle and may encompass multiple E2E operating cycles; however, the following description will generally only be couched in terms of E2E and LLE creation subsystem operating cycles without specific reference to the overall operating cycle of a quantum repeater.

Before describing the first and second quantum repeater embodiments in detail, consideration will be given to a form of LLE creation subsystem suitable for use in quantum repeaters operating on the "synchronized" basis, that is, one that can create LLEs with a high probability of success in successive operating periods. Of course, with long enough operating periods for multiple firings and/or favourable operating conditions (such as a short distance between nodes), even a simple LLE creation subsystem such as depicted in FIG. 5 (or multiple paralleled subsystems of that form) can create LLEs with high probability and would be usable in quantum repeaters operating on the "synchronized" basis in such an environment. However, for multi-kilometer inter-node distances and operating periods of the order of $10^{-6}$ s, the simple LLE creation subsystem depicted in FIG. 5 is unlikely to be adequate whereas the LLE creation subsystem now to be described with reference to FIG. 9 offers much higher reliability.

"Firing Squad" LLE Creation Subsystem

Figure 9:
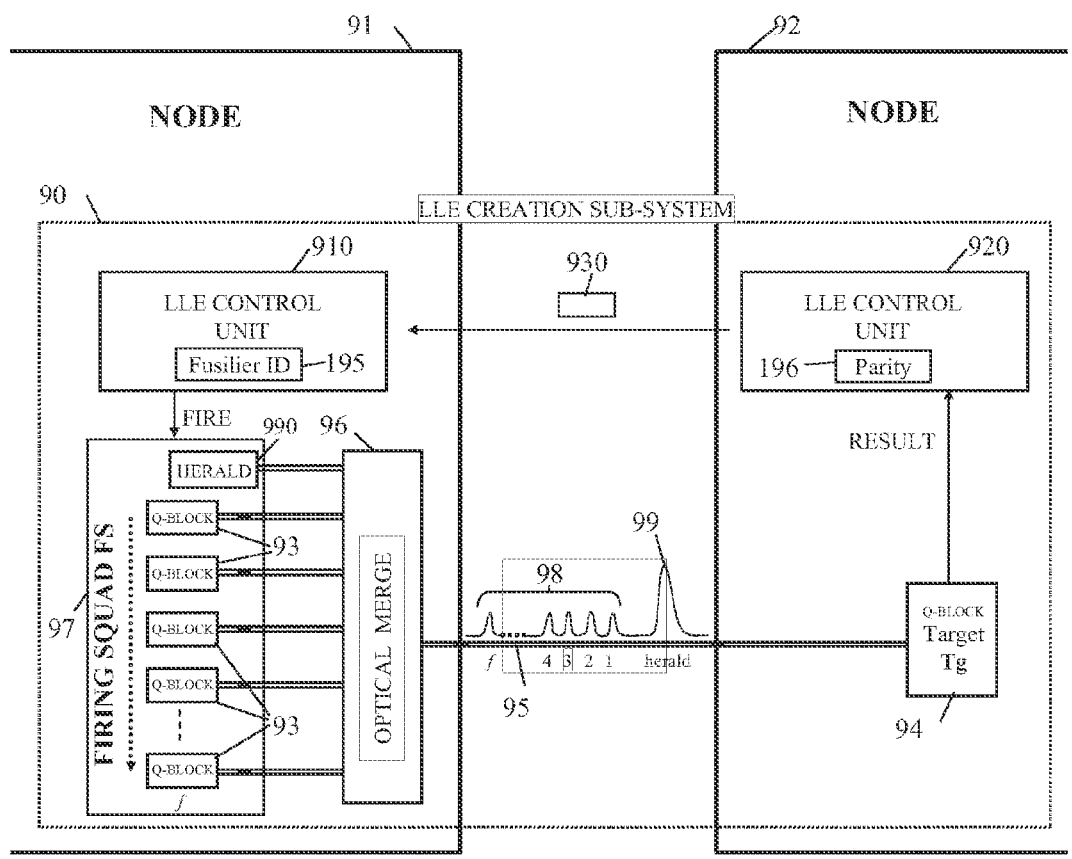
FIG. 9 is a diagram of a local-link entanglement creation subsystem for use in quantum repeaters of the FIG. 7 form.

FIG. 9 depicts a "firing squad" form of LLE creation subsystem 90 formed between two nodes 91 and 92 that are optically coupled by local link fibre 95.

The node 91 comprises an LLE control unit 910, and quantum physical hardware formed by f Q-blocks 93 (with respective IDs 1 to f) that have Capture interaction functionality, and an optical merge unit 96. The Q-blocks 93 (herein "fusilier" Q-blocks) collectively form a "firing squad" 97. The node 92 comprises an LLE control unit 920, and quantum physical hardware formed by a single Q-block 94 with Transfer interaction functionality. The fusilier Q-blocks 93 of the firing squad 97 of node 91 are optically coupled through the optical merge unit 96 and the local link optical fibre 95 to the single target Q-block 94 of node 92. Thus, as can be seen, all the Q-blocks 93 of the firing squad 97 are aimed to lire at the same target Q-block 94.

When the LLE control unit 910 of node 91 outputs a Fire signal to its quantum physical hardware to trigger an LLE creation attempt, the fusilier Q-blocks 93 of the firing squad 97 are sequentially fired and the emitted light fields pass through the merge unit 96 and onto the fibre 95 as a light-field train 98. It may be noted that there will be an orderly known relationship between the fusilier Q-block IDs and the order in which the light fields appear in the train. Rather than each light field being preceded by its own herald, a single herald 99 preferably precedes the light-field train 98 to warn the target Q-block 94 of the imminent arrival of the train 98, this herald 99 being generated by emitter 990 in response to the Fire signal and in advance of the firing of the fusilier Q-blocks 93.

As each light field arrives in sequence at the target Q-block 94 of node 92, the shutter of the target Q-block is briefly opened to allow the light field to pass through the qubit of the target Q-block to potentially interact with the qubit, the light field thereafter being measured to determine whether an entanglement has been created. If no entanglement has been created, the qubit of target Q-block 94 is reset and the shutter is opened again at a timing appropriate to let through the next light field of the train 98. However, if an entanglement has been created by passage of a light field of train 98, the shutter of the target Q-block is kept shut and no more light fields from the train 98 are allowed to interact with the qubit of target Q-block 94. The measurement-result dependent control of the Q-block shutter is logically part of the LLE control unit 920 associated with the target Q-block 94 though, in practice, this control may be best performed by low-level control elements integrated with the quantum physical hardware.

It will be appreciated that the spacing of the light fields in the train 98 should be such as to allow sufficient time for a determination to be made as to whether or not a light field has successfully entangled the target qubit, for the target qubit to be reset, and for the Q-block shutter to be opened, before the next light field arrives.

In fact, rather than using an explicit shutter to prevent disruptive interaction with the target qubit of light fields subsequent to the one responsible for entangling the target qubit, it is possible to achieve the same effect by transferring the qubit state from electron spin to nuclear spin immediately following entanglement whereby the passage of subsequent light fields does not disturb the captured entangled state (the target qubit having been stabilized against light-field interaction). It may still be appropriate to provide a shutter to exclude extraneous light input prior to entanglement but as the qubit is not set into its prepared state until the herald is detected, such a shutter can generally be omitted.

The LLE control unit 920 is also responsible for identifying which light field of the train successfully entangled the target qubit of Q-block 94 and thereby permit identification of the fusilier Q-block 93 (and thus the qubit) entangled with the target Q-block qubit (as already noted, there is a known relationship between the fusilier Q-block IDs and the order in which the light fields appear in the train). For example, the light fields admitted to the target Q-block may simply be counted and this number passed back by the LLE control unit 920 to the node 91 in a 'success' form of a message 930, the LLE control unit 910 of node 91 performing any needed conversion of this number to the ID number of the successful fusilier Q-block 93 before storing the latter in a register 195 for later reference (alternatively, the fusilier ID may be passed on immediately). Of course, if none of the light fields of train 98 is successful in creating an entanglement, a 'fail' form of message 930 is returned and a corresponding indication stored in register 195.

With regard to the parity information contained, in the measurement result in respect of the successful entanglement of the target qubit, this parity information is passed to the control unit 920 which may either store it for later use (for example in a register 196) or pass it on, for example to node 91 in the message 930.

Rather than sequentially firing the fusilier Q-blocks 93 of node 91 to produce the train of light fields 98, an equivalent result can be achieved by firing them all together but using different lengths of fibre to connect each fusilier Q-block to the optical merge unit 96, thereby introducing different delays and creating the light-field train 98.

The number of fusilier Q-blocks 93 in the firing squad 97 is preferably chosen to give a very high probability of successfully entangling target Q-block 94 at each firing of the firing squad, for example 99% or greater. More particularly, if the probability of successfully creating an entanglement with a single firing of a single fusilier Q-block is s, then the probability of success for a firing squad of f fusilier Q-blocks will be:

Firing squad success probability=$1-(1-s)^f$ whereby for s=0.25, 16 fusilier Q-blocks will give a 99% success rate and 32 fusilier Q-blocks a 99.99% success rate. Typically one would start with a desired probability $P_{success}$ of successfully entangling the target qubit with a single firing (i.e. a single light-field train) and then determine the required number f of fusilier qubits according to the inequality:

$P_{success} \leq 1-(1-s)^f$

The time interval between adjacent light fields in the train 98 is advantageously kept as small as possible consistent with giving enough time for the earlier light field to be measured, the target qubit reset and its shutter opened before the later light field arrives. By way of example, the light fields are spaced by 1-10 nanoseconds.

It will be appreciated that with the FIG. 9 form of LLE creation sub-system 90, because there is only one target Q-block 94, the firing squad 97 cannot in practice be re-triggered until the whole sub-system is freed up by the most recently created entanglement being consumed or timing out (or otherwise ceasing to be of use). The minimum time between triggering of the firing squad 97 is thus the round trip time between the nodes (that is, the minimum time for the light train 98 to reach node 92 and for message 930 to be returned to node 91) plus a time for consuming the entanglement (for example, in a merge operation).

First "Synchronized" Quantum Repeater Embodiment (FIG. 10)

The first "Synchronized" quantum repeater embodiment will now be described with reference to FIG. 10, it being understood that the quantum repeater operates in the context of being an intermediate node in a chain of N nodes (such as depicted in FIG. 8 for N=5) between the left and right end nodes of which E2E entanglements are to be created.

The general form of the FIG. 10 quantum repeater corresponds to that shown in FIG. 7, and comprises: quantum physical hardware 60; left and right local link fibres 62, 63, interfacing via optical interfaces 76L, 76R; L-side and R-side LLE control units 72, 73 and merge control unit 77.

The quantum physical hardware 60 (depicted in the generalized manner explained with respect to FIG. 6) comprises:
  a L-side (left-side) target Q-block 94 that forms part of a left LLE creation subsystem 71L;

multiple R-side fusilier Q-blocks 93 that form the firing squad 97 of a right LLE creation subsystem 71R; and
an optical fabric 61 coupled to left and right local link fibres 62, 63.

Figure 11:
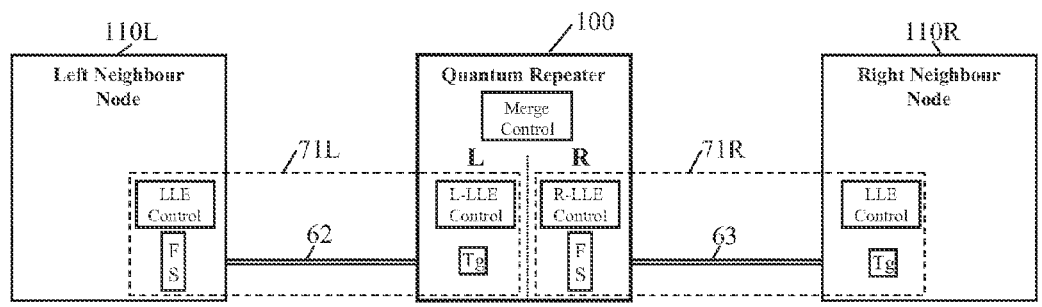
FIG. 11 is a diagram showing how the FIG. 10 quantum repeater cooperates with neighbouring nodes to form two LLE creation subsystems.

The left and right LLE creation subsystems 71L, 71R are substantially of the form illustrated in FIG. 9 for LLE creation subsystem 90. As graphically depicted in FIG. 11, the left LLE creation subsystem 71L comprises:
  (a) in repeater 100, the above-mentioned L-side elements of the quantum physical hardware 60 (in particular, the target Q-block 94, depicted in FIG. 11 by a box with the letters 'Tg' inside), and the left LLE (L-LLE) control unit 72 with parity register 196;
  (b) the left local link fibre 62; and
  (c) in a left neighbour node 110L, a firing squad of fusilier Q-blocks 93 (depicted in FIG. 11 by a box with the letters 'FS' inside) and its associated optical fabric and LLE control unit.

The right LLE creation subsystem 71R comprises:
  (a) in repeater 100, the above-mentioned R-side elements of the quantum physical hardware 60 (in particular, the firing squad 97 depicted, in FIG. 11 as box 'FS'), and the right LLE (R-LLE) control unit 73 with fusilier ID register 195;
  (b) the right local link fibre 63; and
  (c) in a right neighbour node 110R, a target Q-block (box 'Tg') and its associated optical fabric and LLE control unit.

Figure 12:
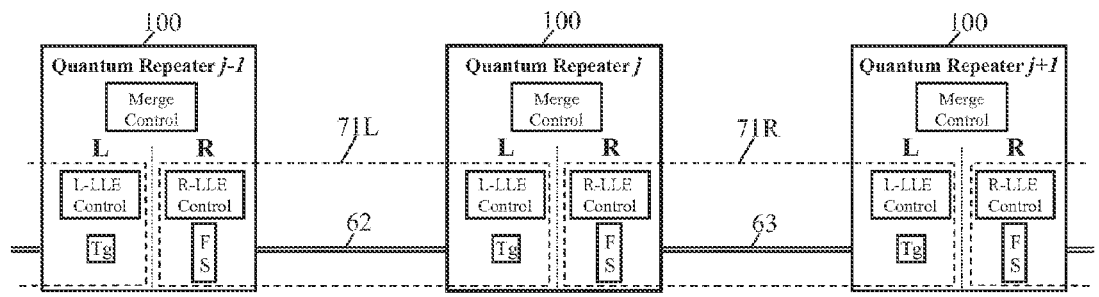
FIG. 12 is a diagram showing how FIG. 10 quantum repeaters can be serially optically coupled to provide LLE creation subsystems between neighbouring repeaters.

With this arrangement of complementary firing squad and target portions of a FIG. 9 LLE creation subsystem 90, multiple quantum repeaters 100 can be optically coupled in series such as to form one LLE creation subsystem between every pairing of neighbouring repeaters as is illustrated in FIG. 12 for quantum repeaters j−1, j, j+1 (the quantum repeater j forming an LLE creation subsystem 71L with its left neighbour repeater j−1 and an LLE creation subsystem 71R with its right neighbour repeater +1).

As only a single LLE creation subsystem exists between each pair of neighbour nodes, the E2E operating cycle Φ and the top-level repeater operating cycle both correspond timewise to the LLE creation subsystem operating cycle. Therefore, for convenience in describing the FIG. 10 embodiment, the term 'operating cycle' is used without qualification unless such qualification (e.g. 'E2E' or 'LLE creation subsystem') is helpful to understanding; furthermore, although the symbol Φ was specifically designated above as referring to the E2E operating cycle, for the FIG. 10 embodiment the symbol Φ can also be understood as an indicator of LLE creation subsystem operating cycle.

The optical fabric 61 of the quantum repeater 100, as well as coupling the L-side and R-side Q-blocks 94, 93 to the left and right local link fibres 62, 63 respectively for LLE creation, also provides for the selective optical coupling of the L-side target Q-block 94 to a selected one of the R-side fusilier Q-blocks 93 for the purpose of effecting a local merge operation on the qubits of these Q-blocks.

During LLE creation, the quantum physical hardware 60 receives firing control signals from the R-LLE control unit 73 for controlling the R-side elements (in particular, the triggering of the firing squad 97), and outputs result signals (success/failure; parity; fusilier-identifying information) from the L-side target Q-block 94 to the L-LLE control unit 72. For a local merge operation, the quantum physical hardware 60 receives merge control signals from a merge control unit 77 (these signals selecting the fusilier Q-block 93 that is to participate in the merge, and triggering the merge itself), and outputs back to the unit 77 results signal (success/failure; parity) regarding the outcome of the merge operation.

Figure 13A:
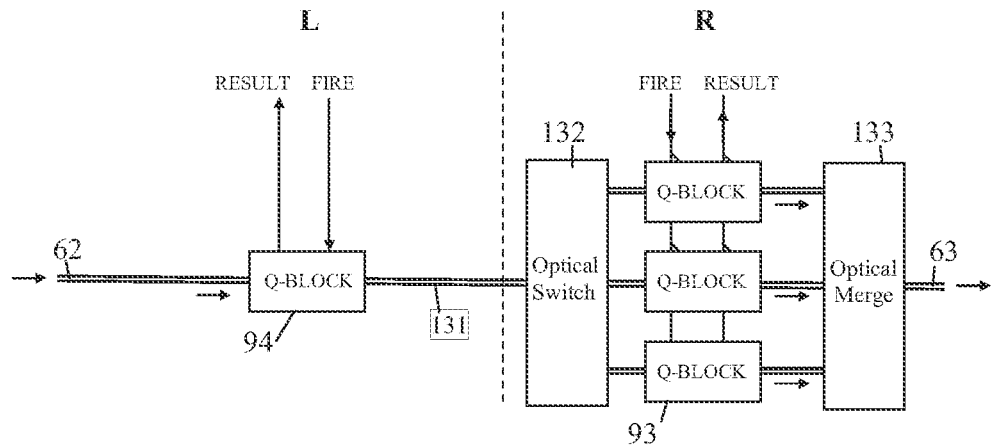
FIGS. 13A & 13B show respective example implementations of quantum physical hardware of the FIG. 10 quantum repeater embodiment.
Figure 13B:
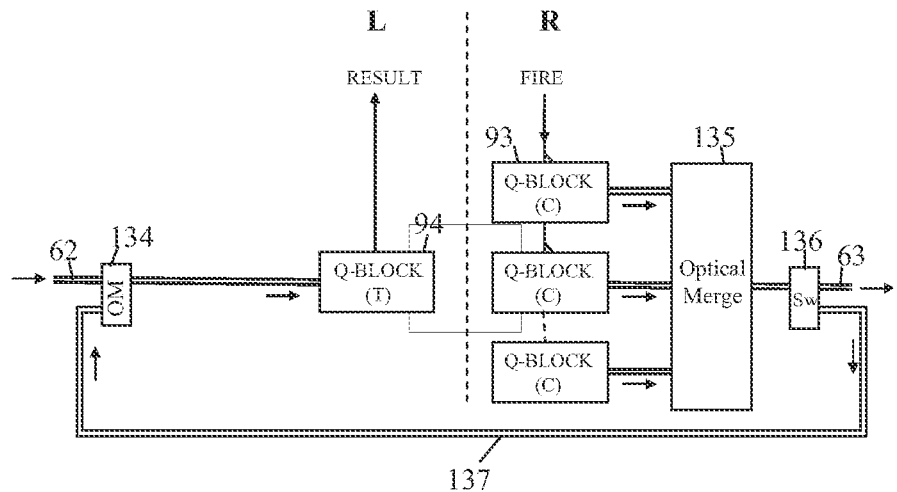

FIGS. 13A and 13B illustrated two possible implementations of the optical fabric 61 depending on the nature of the Q-blocks 93 and 94.

The FIG. 13A optical fabric implementation is applicable to the case where the fusilier and target Q-blocks 93, 94 are universal Q-blocks 44 (c.f. FIG. 4). In this case, the left local link fibre 62 interfaces directly with the optical input of the target universal Q-block 94, and the optical output of this universal Q-block is optically coupled to an intermediate optical fibre 131. An active optical switch 132 interfaces the intermediate fibre 131 with the inputs of the fusilier universal Q-blocks 93 and a passive optical merge unit 133 puts the outputs of the fusilier Q-blocks 93 onto the right local link fibre 63. During LLE creation operation, the target Q-block 94 is set up for Transfer interaction and light fields coming in over the left link fibre 62 are fed to the target Q-block; the fusilier Q-blocks 93 are set up for Capture interaction and the optical merge unit 133 couples the fusilier Q-blocks 93 to the right local link fibre 63. For a merge operation, the target Q-block 94 is set up for Capture interaction and the fusilier Q-block involved in the merge is set up for Transfer interaction (the fusilier Q-block concerned will have been indicated in the merge set-up signals fed to the quantum physical hardware 60); the optical switch 132 is also set by the merge set up signals to optically couple the target Q block 94 to the fusilier Q-blocks 93 involved in the merge.

The FIG. 13B optical fabric implementation is applicable to the case where the target Q-block 94 is a Transfer Q-block 42 (c.f. FIG. 4) and the fusilier Q-blocks 93 are Capture Q-blocks 40. In this case, a passive optical merge unit 135 puts the outputs of the fusilier Capture Q-blocks 94 onto a single fibre which is then switched by an active optical switch 136 either to the right local link fibre 63 or to a loop-back optical fibre 137. A passive optical merge unit 134 fronts the target Transfer Q-block 93, the optical merge unit 134 being coupled on its input side to the left local link fibre 62 and the loop-back optical fibre 137. For an LLE creation operation, the optical switch 135 is set to feed the light fields output by the fusilier Capture Q-blocks 93 to the right local link fibre 63. For a merge operation, the optical switch 135 is set to feed the light field output by a selected one of the fusilier Capture Q-blocks 93 to the loop-back fibre 137 (the Q-block concerned will have been indicated in the merge set-up signals fed to the quantum physical hardware 60).

Returning to a consideration of FIG. 10, the left LLE control unit 72 associated with the L-side target Q-block 94 of LLE creation subsystem 71L, communicates with the firing-squad-associated LLE control unit of the same LLE creation subsystem (this control unit being in the left neighbour node) via left LLEC channel 74. In the present example embodiment, the left LLEC channel 74 is imposed on the left local link fibre 62 via optical interface 76L and used to pass LLE creation "success/failure" messages (the message 930 of FIG. 9 with fusilier ID being included as appropriate) from the L-LLE control unit 72 to the LLE control unit of the left neighbour node.

Similarly, the right LLE control unit 73 associated with the R-side fusilier Q-blocks 93 of the firing squad 97 of LLE creation subsystem 71R, communicates with the target-associated LLE control unit of the same LLE creation subsystem (this control unit being in the right neighbour node) via right LLEC channel 75. The right LLEC channel 75 is imposed on the right local link fibre 63 via optical interface 76R and used to pass, to the R-LLE control unit 73, LLE creation "success/failure" messages (the message 930 of FIG. 9 with fusilier ID as appropriate) from the LLE control unit of the right neighbour node.

Merge control is effected by merge control (MC) unit 77 which, as well as interfacing with the quantum physical hardware to initiate a merge operation and receive back result signals, is arranged to exchange various signals with the L-LLE control unit 72 and R-LLE control unit 73 and to communicate with the merge control units of other nodes by messages sent over a left-to-right merge control (LR-MC) channel carried, on left and right optical fibres 78LR and 79LR respectively, and a right-to-left merge control (RL-MC) channel carried on left and right optical fibres 78RL and 79RL respectively. Transmit (Tx) and receive (Rx) interfaces 101, 102 couple the fibres 78, 79 to the MC unit 77.

As will be more fully explained below, the LR-MC channel carries cumulative failure and parity messages each concerning a respective E2E operating cycle $\Phi$, and the RL-MC channel carries cumulative failure messages each concerning a respective E2E operating cycle. As well as controlling the execution of a local merge operation, the merge control unit 77 is responsible for contributing its own parity and failure information to the appropriate cumulative messages on the LR-MC and RL-MC channels.

To permit the synchronized operation of a chain of geographically separated quantum repeaters of the FIG. 10 form, the repeater 100 includes a clock 103 that can be synchronized with similar clocks provided in other such repeaters. One way to provide synchronized clocks in a set of quantum repeaters 100 would be to transmit a common timing signal to all repeaters from a source a known distance from each repeater thereby enabling each repeater to make its own adjustments to the timing signal to take account of propagation delays; in fact, the GPS system provides a very convenient synchronization system of this type and the clock 103 could be based on such a system. One drawback to using GPS is that its signals are not readily available underwater and so could not be used by quantum repeaters placed in submarine fibre optic cables.

In the present embodiment, therefore, a different approach is taken where the repeater clocks are synchronized based on a synchronization signal cyclically transmitted from one end node of the chain including the quantum repeaters. Assuming an initial calibration has been carried out to determine the propagation delay between each pair of neighbour nodes, a node receiving the synchronization signal from its neighbour can determine, on the basis that the signal was transmitted by its neighbour at a synchronization-cycle start at the originating end node, the point in time corresponding to the next synchronization-cycle start; the node is then arranged to transmit on the synchronization signal at that point in time to its neighbour node away from the originating end node. The overall result, after a number of synchronization cycles sufficient to allow the synchronization signal to have propagated fully down the chain of nodes, is that every node transmits a synchronization signal at each synchronization-cycle start time at the originating end node. As each node can determine the synchronization-cycle start times, these are used as common timing points for the internal operation of the nodes. Preferably, this approach to synchronization is implemented by synchronizing operation of the internal clock 103 of each node to the synchronization start times using the received synchronization signals and a phase-locked loop arrangement that takes account of the propagation delay of the received synchronization signal from the sending neighbour node; internal operation of each node is then effected relative to timing signals output by the clock 103 whereby if, for any reason, a synchronization signal should be missed, internal operation of the node is unaffected.

As will be more fully described below, in the present embodiment each operating cycle Φ starts with the firing squad 97 of every quantum repeater 100 being triggered to fire a light-field train 98 (see FIG. 9) preceded by a herald 99, towards the neighbour node containing the target Q-block 94 of the LLE creation subsystem concerned. It is therefore convenient (though not essential) to use the herald 99 as the synchronization signal for effecting clock synchronization; thus, when the herald 99 is received at the target end of the LLE creation subsystem concerned, it is extracted and passed to the internal clock 103 of the node to keep the clock in synchronization with the clocks 103 of the other nodes (for example, using the phase-locked loop arrangement mentioned above). In the present embodiment, the synchronization cycle period therefore corresponds to the LLE creation subsystem operating cycle period, though this need not be the case. Furthermore, the period of clock 103 will be taken to be the same as the LLE creation subsystem operating cycle period, though again this need not be the case (for example, the clock could be run with a period of one quarter of the LLE creation subsystem operating cycle period).

The operation of the LLE control units 72, 72 (and therefore of the quantum physical hardware 60) and of the merge control unit 77 are timed relative to timing signals fed to these units from clock 103. In particular, the clock 103 is arranged to output a cycle-start timing signal at the start of each operating period, this cycle-start signal triggering the generation of a Fire signal by the R-LLE control unit 73 to trigger the firing squad 97 and thus the sending of the herald 99 followed by the light-field train 98.

For the FIG. 10 embodiment, the operating cycle period is necessarily at least as long as the longest light-speed round-trip time between pairs of neighbour nodes—this is because during an operating cycle, an LLE must be created between each pair of neighbour nodes by sending a light-field train between the nodes, and the identity of the fusilier Q-block involved in the resulting LLE must be returned to the node that sent the train. The operating cycle period in fact needs to be greater than the longest light-speed round-trip time by an amount sufficient to accommodate certain other operating-cycle operations such as the merging of entanglements and to allow for a degree of synchronization error between clocks in different nodes. For ease of explanation of the operation of the FIG. 10 embodiment, it is assumed that the operating cycle period is four times the longest inter-node light-speed single trip time τ (also referred to as the inter-node "transit time"); as already indicated, shorter operating cycle periods are possible for the FIG. 10 embodiment down to just over twice the longest inter-node transit time.

Figure 14:
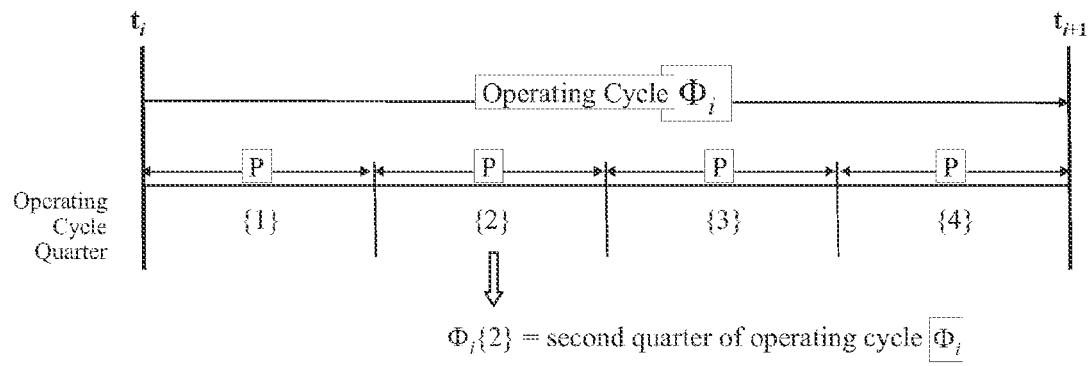
FIG. 14 is a graphical depiction of the timing notation used herein in describing the operation of the FIG. 10 quantum repeater.

FIG. 14 graphically depicts the timing notation used below in describing the operation of the FIG. 10 quantum repeater. The $i^{th}$ operating cycle is designated $\Phi_i$ and extends between times $t_i$ and $t_{i+1}$. For convenience of explanation, each operating cycle is divided into four equal quarters each of duration P (and since in this example the operating cycle period is set to be four times the longest inter-node transit time τ, the quarter periods of the operating cycle have a duration P that corresponds to the longest inter-node transit time τ). Individual operating-cycle quarters are referenced by the operating cycle designation followed by the quarter number 1, 2, 3 or 4 in curly brackets—thus the second quarter of operating cycle $\Phi_i$ is referenced $\Phi_i\{2\}$.

Operation of the FIG. 10 quantum repeater over the course of an operating cycle $\Phi_i$ will now be described with reference to FIG. 15 which depicts what is happening in an example LLE creation subsystem, LLE CSS 150, formed by and between two neighbour quantum repeaters 100 in a repeater chain, midway through each quarter of the operating cycle. The LLE creation subsystem, LLE CSS, 150 comprises firing squad (FS) 97 and target Q-block (Tg) 94 in respective quantum repeaters 100 that are spaced by a distance corresponding to the longest transit time τ in the node chain (this time here being the same as the clock quarter period P).

Considering operation in each operating-cycle quarter in turn:

First Operating-Cycle Quarter $\Phi_i\{1\}$

At the start of operating cycle $\Phi_i$ the firing squad (FS) 97 of LLE CSS 150 is triggered whereby midway through the first operating-cycle quarter $\Phi_i\{1\}$, the herald 99 emitted by the firing squad is halfway toward the target Q-block (Tg) 94 followed by the light-field train 98. It should be noted that FIG. 15 exaggerates the spatial distribution of the herald and light-field train relative to what would actually be the case for typical inter-light-field time intervals and typical inter-node distances. In any event, it is here assumed that the firing squad. 97 will have fully sent out the herald and light-field train within the duration P of the first operating-cycle quarter $\Phi_i\{1\}$.

Second Operating-Cycle Quarter $\Phi_i\{2\}$

The light-field train begins to arrive at the target Q-block (Tg) at the start of the second operating-cycle quarter $\Phi_i\{2\}$. By midway through this quarter all or most of the train 98 will have arrived node holding the target Q-block and an LLE will probably already have been created (indicated by dashed arrowed arc 151 in FIG. 15).

Third Operating-Cycle Quarter $\Phi_i\{3\}$

Figure 15:
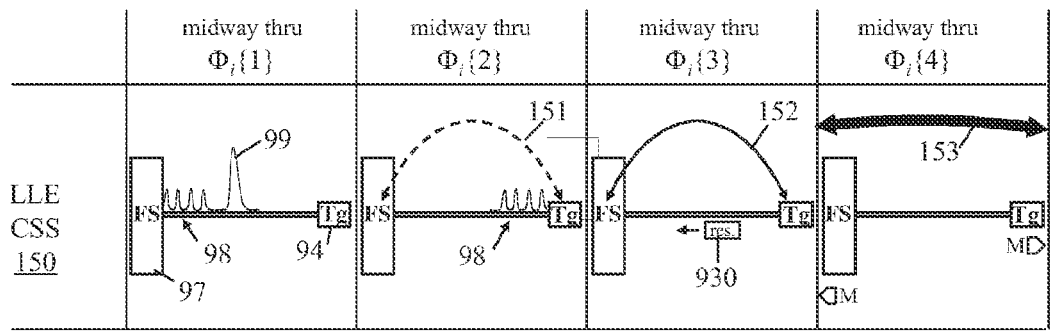
FIG. 15 is a graphical depiction of what is happening in an LLE creation subsystem of the FIG. 9 form during successive quarter operating cycle quarter periods of the FIG. 10 quantum repeater.

By midway through the third operating-cycle quarter $\Phi_i\{3\}$, the light-field, train has all arrived at the node holding the target Q-block (Tg) and an LLE will, with high probability (dependent on the factors discussed above in relation to FIG. 9), have been created (indicated by solid arrowed arc 152 in FIG. 15). The parity information measured at the target Q-block will have been stored in register 196 of the L-LLE control unit associated with the target Q-block, and a success message 930 (including a successful fusilier indicator) will be on its way back to the R-LLE control unit 73 associated, with the firing squad (FS). By the end of the third quarter at the latest, this control unit 73 will have stored the successful fusilier ID in its register 195 (see FIG. 10). If LLE creation was unsuccessful, a fail message 930 would have been returned and a corresponding indication stored in register 195.

Fourth Operating-Cycle Quarter $\Phi_i\{4\}$

Midway through the fourth operating-cycle quarter $\Phi_i\{4\}$, each and every quantum repeater of the repeater chain, including the two neighbour quantum repeaters 100 forming LLE CSS 150, effect a merge operation between its L-side qubit and the successful R-side fusilier qubit. More particularly and with reference to FIG. 10, in each repeater 100 a merge firing functional block 104 operating in dependence on cycle timing signals fed it from clock 103, retrieves the identity of the successful R-side fusilier Q-block from register 195 and incorporates this ID into the merge control signals fed to the quantum physical hardware 60 thereby to set up and trigger a merge between the L-side qubit and the identified R-side fusilier qubit of the repeater. In FIG. 15, the merges effected by the two quantum repeaters 10 forming LLE CSS 150 are indicated by the small block arrows labelled with 'M'.

Assuming LLEs were successfully created, between all pairs of neighbour nodes and all merge operations are successful, the result is the creation of an E2E entanglement 153, regardless of the order in which the less extensive entanglements are merged by the individual merge operations effected by the quantum repeaters.

If any LLE has not been successfully created, this is preferably detected by the merge control unit 77 on reading the register 195 causing the merge control unit to skip the merge operation and proceed as if a failure indication had been returned in the merge results.

Although in the present example, the merge operation is initiated midway through the fourth operating-cycle quarter $\Phi_i\{4\}$ on the expectation that left and right LLEs will be present, it is in fact possible for the repeater to initiate the merge at any point in a time slot of the operating cycle when known L-side and R-side qubits are known to be (through measurement results), or at least can be expected to be (due to the elapsed time being sufficient for reliable LLE creation to have been effected), entangled leftwards and rightwards respectively—in the present example, this time slot corresponds to the fourth operating-cycle quarter $\Phi_i\{4\}$.

In each repeater, the merge result measurements are passed to the merge control unit 77 and stored. More particularly, the merge parity information is first combined by an exclusive OR operation with the L-side LLE parity information retrieved from the register 196 before being stored to FIFO parity queue 106. Merge success/failure information is stored to a FIFO failure queue 105 (hereinafter this success/failure information is taken to be, by way of example, a binary value with '1' representing 'failure'; this information is accordingly simply referred to as 'failure' information). The FIFO queues 105 and 106 are thus advanced just after the midpoint of the fourth quarter of each operating cycle as failure and parity information relevant to that cycle is added whereby at the start of each operating cycle the most recent queue entries relate to the immediately preceding operating cycle.

Although the foregoing describes how an E2E entanglement is created in the course of an operating cycle, this is not the end of the story because at least cumulative parity information collected from all the quantum repeaters needs to be passed to at least one end node. In the present embodiment, cumulative parity information is passed to the right end node in LR-MC messages and cumulative failure information is passed to both end nodes in LR-MC and RL-MC messages to indicate whether an E2E entanglement has been successfully formed.

In general terms, at the start of an operating cycle $\Phi_{i+1}$, the left end node sends out a LR-MC message to accumulate failure and parity information from each quantum repeater for the E2E entanglement just created in the preceding operating cycle $\Phi_i$; similarly, the right end node sends out a RL-MC message to accumulate failure information from each quantum repeater for the E2E entanglement just created, in the operating cycle $\Phi_i$. As each of these messages traverses each quantum repeater, the latter combines the cumulative information in the message with its own contribution from the relevant queue 105, 106 for the operating cycle $\Phi_i$. More particularly, in the example implementation of the FIG. 10 embodiment, local failure information from the failure queue 105 is combined into the cumulative failure information in the LR-MC and RL-MC messages through respective OR functions 109, 107 whereby any local failure sets the cumulative failure value to '1', that is, to 'failure'; local parity information is combined into the cumulative parity information in the LR-MC message through XOR function 108 (operating independently on the two parity bits) whereby any uneven parity will toggle the corresponding cumulative parity bit value. Of course, it is necessary to carefully control extraction of information from the queues 105, 106 to ensure that the extracted information corresponds to the same operating cycle as the cumulative information with which the extracted information is to be combined. An alternative approach would be for each repeater simply to store parity and failure information in memory along with an operating cycle indicator which could then be matched up to an operating cycle indicator accompanying the cumulative information carried by the LR-MC and RL-MC messages.

The LR-MC message for operating cycle $\Phi_i$ reaches the right end node at the same time as the RL-MC message for the same cycle reaches the left end node whereby both end nodes come to know at the same time the operative status (success/failure) of the E2E entanglement created in the operating cycle $\Phi_i$; the right end node will also simultaneously know the parity information relevant to use of the E2E entanglement.

Figure 16:
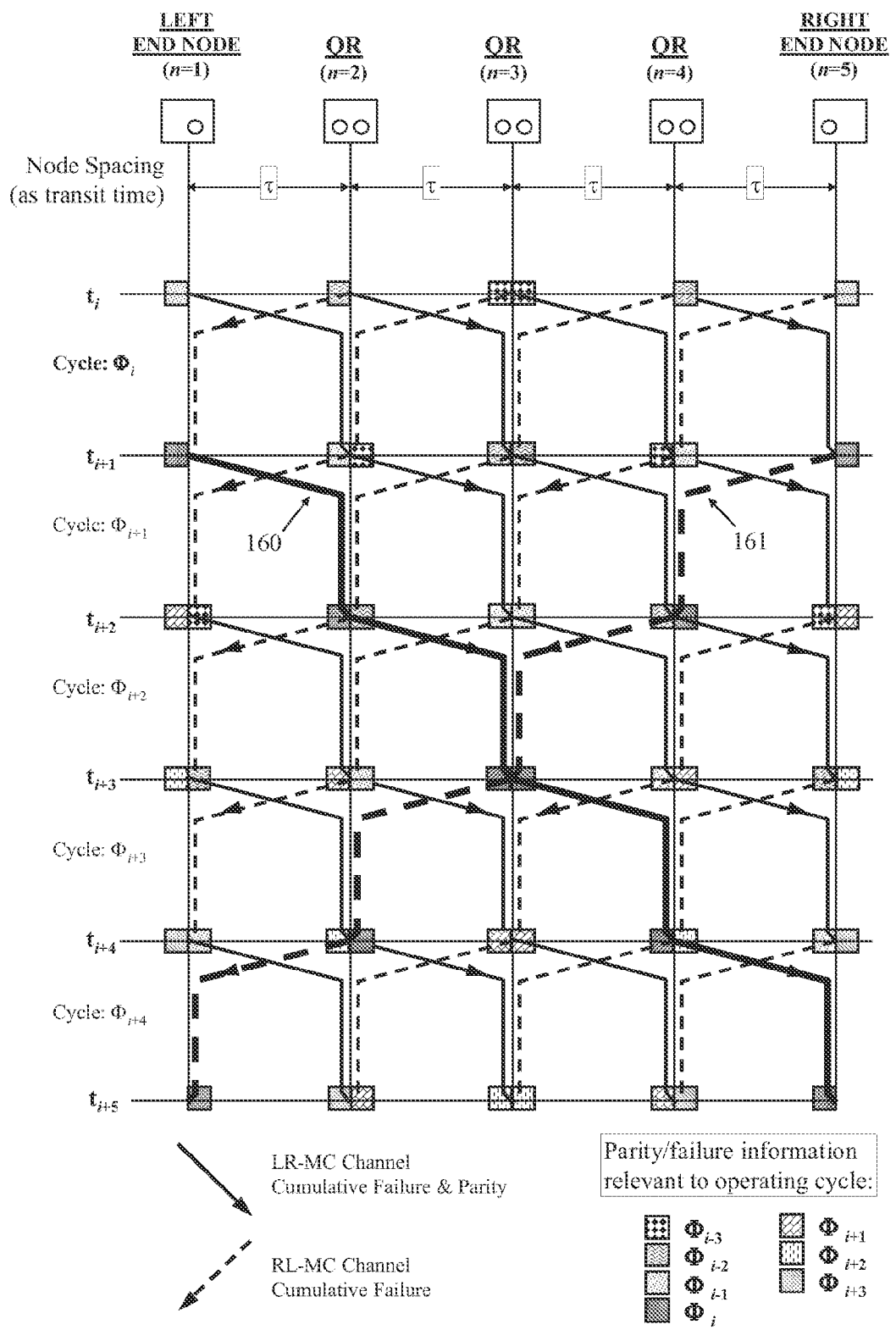
FIG. 16 is a message flow diagram depicting one example messaging arrangement for accumulating the failure and parity information for a chain of repeaters of the FIG. 10 form.

FIG. 16 depicts a message flow diagram in respect of one example messaging arrangement for accumulating the failure and parity information in the LR-MC and RL-MC messages as they pass along a chain of five nodes (such as depicted in FIG. 8) between the left and right end nodes of which E2E entanglements are to be created. For simplicity, the nodes are all spaced by the same distance corresponding to a transit time of τ (operation is not affected by shorter inter-node spacing other than by the earlier arrival of messages than depicted). FIG. 16 covers the time period $t_i$ to $t_{i+5}$ (that is, the duration of five operating cycles $\Phi_i$ to $\Phi_{i+4}$). The failure and parity information being accumulated is represented by boxes whose fill is specific to the operating cycle to which the information relates; at least partial information for operating cycles $\Phi_{i-3}$ to $\Phi_{i+3}$ is depicted, LR-MC message flows are shown in solid lines with the LR-MC message flow accumulating failure and parity information for operating cycle $\Phi_i$ being shown by the thick solid line 160. RL-MC message flows are shown in dashed lines with the RL-MC message flow accumulating failure information for operating cycle $\Phi_i$ being shown by the thick dashed line 161.

In the example messaging arrangement illustrated in FIG. 16, each intermediate node (which will be a quantum repeater node) sends out one LR-MC cumulative failure and parity information message and one RL-MC cumulative failure information message at the start of each operating cycle, having combined its own local contribution with the cumulative information in LR-MC and RL-MC messages received during the preceding operating cycle (and temporarily stored in the receive interfaces 102—see FIG. 10). It should be noted that the LR-MC failure and parity message and RL-MC failure message being prepared and sent out at the same time by a repeater node will generally not relate to the same operating cycle as each other, the exception being where the messages are being processed by a middle node of a chain (such as node n=3 in FIG. 16).

For the LR-MC message being sent out in the $c^{th}$ operating cycle $\Phi_c$ by quantum repeater node j, the cumulative failure and parity information will relate to the $(c-j)^{th}$ operating cycle, the relevant local failure and parity information being extracted from the queues 105, 106 by tapping the appropriate queue slots (as depicted in FIG. 10, if being assumed that this information is extracted after the entry of the merge result information for the (c-1) cycle).

For the RL-MC message being sent out in the $c^{th}$ operating cycle $\Phi_c$ by quantum repeater node j in a chain of N nodes, the cumulative failure information will relate to the $(c-1-(N-j))^{th}$ operating cycle, the relevant local failure information being extracted from the queue 105 by tapping the appropriate queue slot (as depicted in FIG. 10, again on the assumption that this information is extracted after the entry of the merge result information for the (c-1) cycle).

Considering more specifically the flow of the LR-MC message accumulating failure and parity information for the operating cycle $\Phi_i$ (the thick solid line 160 in FIG. 16), at the start of the first quarter of operating cycle $\Phi_{i+1}$, the left end node (n=1) sends a LR-MC message to its neighbour quantum repeater node (n=2) with one cumulative failure bit and two cumulative parity bits. As the left end node does not itself effect a merge operation, the cumulative failure bit has a value '0' unless no LLE was created between the left end node and its neighbour quantum repeater node (in which case the failure bit has a value '1'). The cumulative parity bits are both set to indicate even parity. The LR-MC message sent by the left end node is received by its neighbour quantum repeater node (n=2) at the start of the second quarter of operating cycle $\Phi_{i+1}$ and the cumulative failure and parity bits are temporarily stored in receive interface 102 (as indicated by the vertical portion of line 160 at node n=2 during the second, third and fourth quarters of operating cycle $\Phi_{i+1}$). At the start of the first quarter of the operating cycle $\Phi_{i+2}$, quantum repeater node (n=2) combines its local failure and parity information for operating cycle $\Phi_i$ with the cumulative failure and parity information temporarily stored in interface 102 and sends on the new cumulative failure and parity information in a LR-MC message to its right neighbour node (n=3)—and so on rightwards along the chain from node to node until the right end node is reached in operating cycle $\Phi_{i+4}$. The right end node completes the process by adding it own local parity information in respect of the left LLE set up for operating cycle $\Phi_i$.

As regards the flow of the RL-MC message accumulating failure information for the operating cycle $\Phi_i$ (the thick dashed line 161 in FIG. 16), at the start of the first quarter of operating cycle $\Phi_{i+1}$, the right end node (n=5) sends a RL-MC message to its neighbour quantum repeater node (n=4) with one cumulative failure bit. This cumulative failure bit has a value '0' since the right end node does not itself effect a merge operation and any failure to create an LLE between the right end node and its neighbour quantum repeater node is picked up by the latter. The RL-MC message sent by the right end node is received by its neighbour quantum repeater node (n=4) at the start of the second quarter of operating cycle $\Phi_{i+1}$ and the cumulative failure bit is temporarily stored in receive interface 102 (as indicated by the vertical portion of line 161 at node n=4 during the second, third and fourth quarters of operating cycle $\Phi_{i+1}$. At the start of the first quarter of the operating cycle $\Phi_{i+2}$, quantum repeater node (n=4) combines its local failure information for operating cycle $\Phi_i$ with the cumulative failure information temporarily stored in interface 102 and sends on the new cumulative failure information in a RL-MC message to its left neighbour node (n=3)—and so on leftwards along the chain from node to node until the left end node is reached in operating cycle $\Phi_{i+4}$. The left end node completes the process by adding it own local failure information in respect of the right LLE that should have been set up for operating cycle $\Phi_i$.

Figure 17:
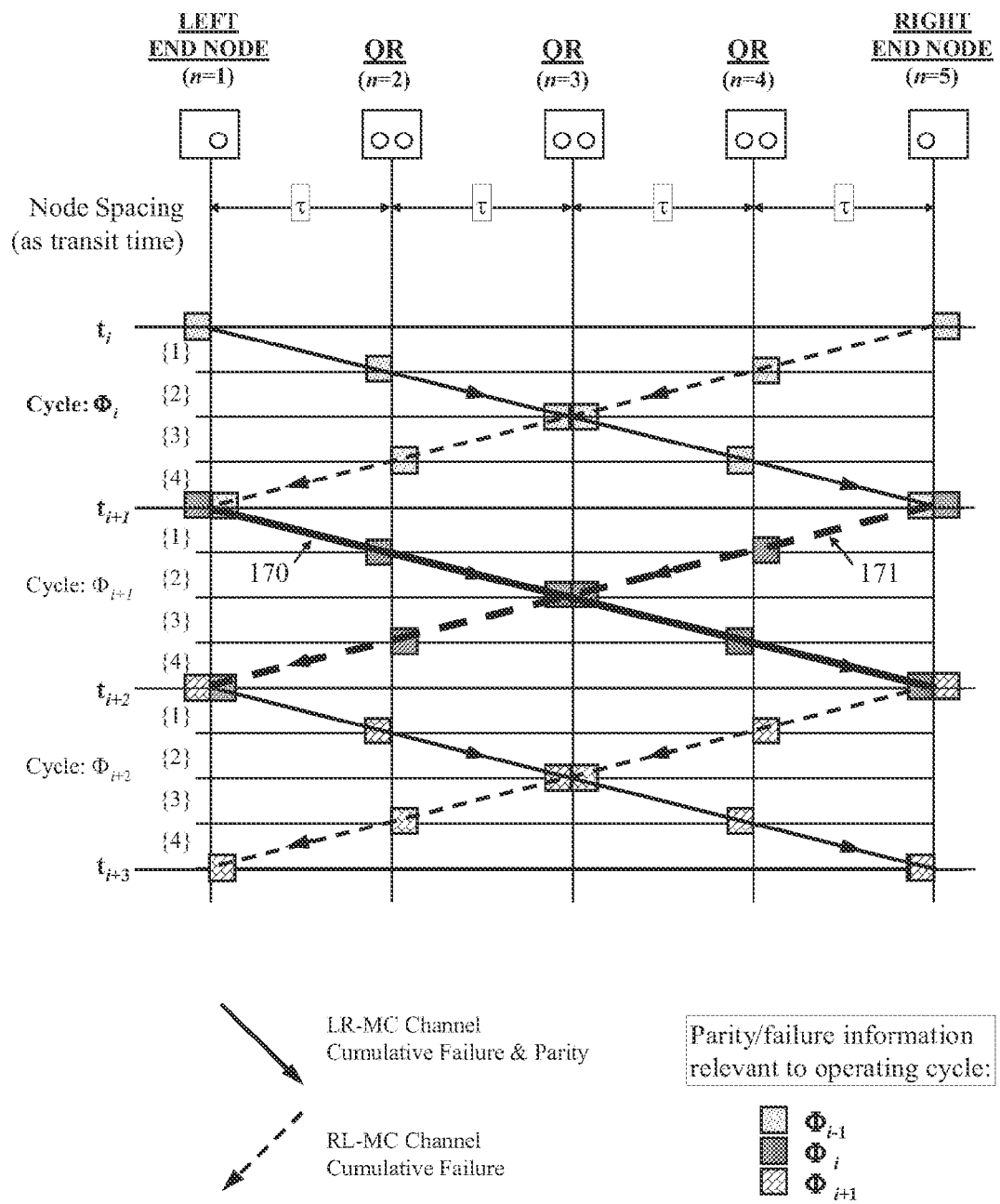
FIG. 17 is a message flow diagram depicting a second example messaging arrangement for accumulating the failure and parity information for a chain of repeaters of the FIG. 10 form.

FIG. 17 depicts (in a manner similar to FIG. 16 for the first example messaging arrangement) a message flow diagram in respect of a second example messaging arrangement for accumulating the failure and parity information in the LR-MC and RL-MC messages passing along a chain of five nodes all spaced by the same distance corresponding to a transit time of τ. FIG. 17 covers the time period $t_i$ to $t_{i+3}$ (that is, the duration of three operating cycles $\Phi_i$ to $\Phi_{i+2}$). The LR-MC message flow accumulating failure and parity information for operating cycle $\Phi_i$ is shown by the thick solid line 170 and the RL-MC message flow accumulating failure information for operating cycle $\Phi_i$ is shown by the thick dashed line 171.

The second example messaging arrangement speeds the transmission of the cumulative failure and parity information by cutting out most of the message holding time at the nodes that is present in the first example messaging arrangement (represented by the vertical portions of the message flow line 160, 161 in FIG. 16). This is done by having each node transmit on the cumulative failure and parity information at the start of the next cycle quarter following its receipt rather than waiting to the start of the next full cycle. With the inter-node transit time corresponding to the longest transit time τ and thus to the cycle quarter period P, the effect is a substantially continuous onward transmission of the cumulative failure and parity information (it being appreciated that in practice the cycle quarter period P would need to be slightly greater than τ to allow for processing at each node, in particular the incorporation of the local failure and parity information).

For the LR-MC message being sent out in the $c^{th}$ operating cycle $\Phi_c$ by quantum repeater node j, the cumulative failure and parity information will relate to the $(c-1-\text{floor}[(j-1)/4])^{th}$ operating cycle and will be transmitted at the start of cycle quarter $(1+[(j-1) \bmod 4])$. The relevant local failure and parity information is extracted from the queues 105, 106 by tapping the appropriate queue slots (different to those depicted in FIG. 10 but readily determined by persons skilled in the art).

For the RL-MC message being sent out in the $c^{th}$ operating cycle $\Phi_c$ by quantum repeater node j in a chain of N nodes, the cumulative failure information will relate to the $(c-1-\text{floor}[(N-j)/4])^{th}$ operating cycle and will be transmitted at the start of cycle quarter $(1+[(N-j) \bmod 4])$. The relevant local failure information is extracted from the queue 105 by tapping the appropriate queue slot (again, different to that depicted in FIG. 10 but readily determined by persons skilled in the art).

It may be noted that although in the FIG. 17 example the end-to-end message transmission time is one fall operating cycle, this is merely an artefact of there being five nodes in the example chain.

With regard to the left and right end nodes between which the E2E entanglements are created, these nodes are not themselves quantum repeaters though, of course, they comprise functionality for completing the LLE creation subsystems involving their respective neighbour quantum repeaters, and functionality for sending/receiving the LR-MC cumulative failure and parity message and RL.MC cumulative failure messages as described above. In the present example, where the firing squads 97 fire left to right along the node chain, the left end node also provides the master clock and sends out synchronization signals in the form of the heralds 99 sent by its firing squad.

The left and right end nodes also serve a further function, namely to free up at the end of each operating cycle the entangled end-node LLE creation subsystem qubits between which an E2E has just been formed. This is done by providing each end node with an output buffer comprising multiple Q-blocks and shifting each newly created E2E entanglement across into qubits of the buffers pending their consumption by consumer applications associated with the end nodes. Of course, such buffering may not be required where the consumer applications are arranged to consume E2E entanglements as they become available at the end of each operating cycle and can tolerate the loss of such entanglements if not timely consumed.

Figure 18:
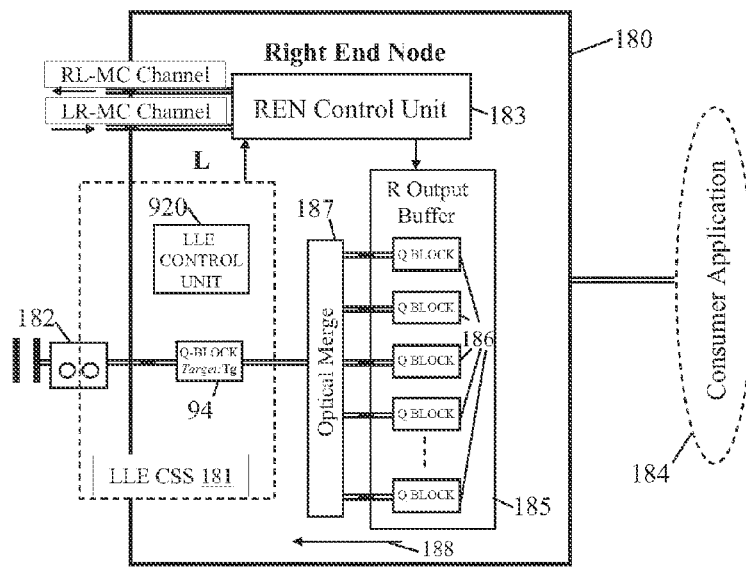
FIG. 18 is a diagram of an example implementation of a right end node of a chain of nodes having intermediate nodes formed by FIG. 10 quantum repeaters.
Figure 19:
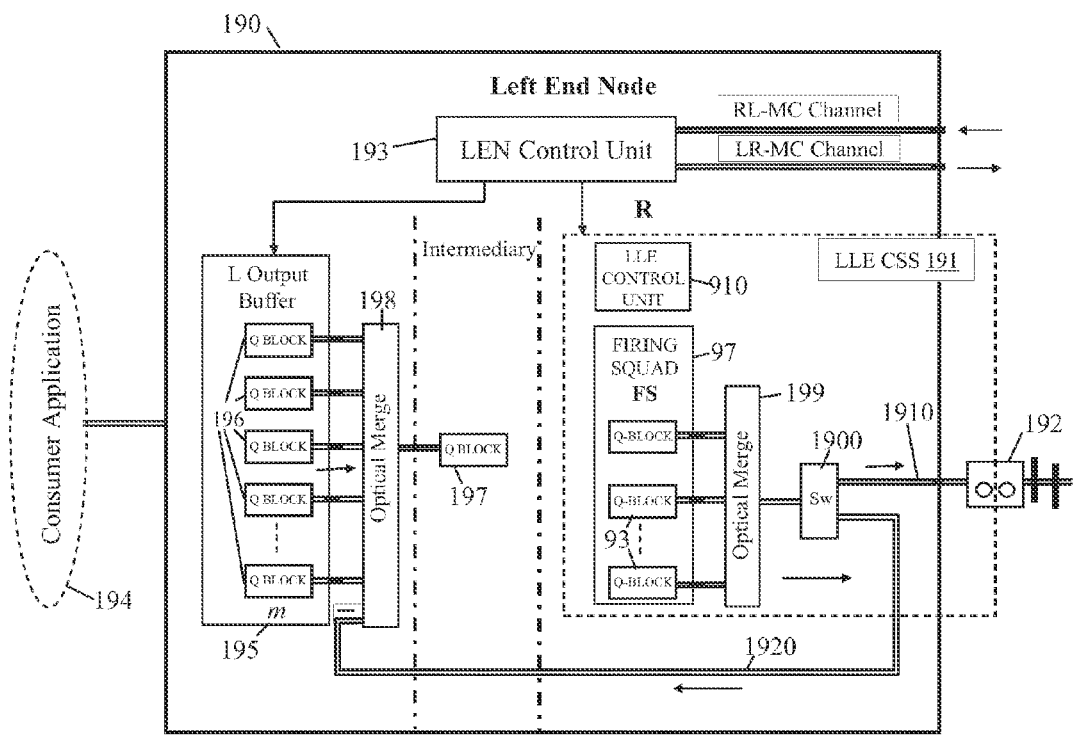
FIG. 19 is a diagram of an example implementation of a left end node of a chain of nodes having intermediate nodes formed by FIG. 10 quantum repeaters.

FIGS. 18 and 19 depict example implementations of right and left end node respectively.

The right end node 180 shown in FIG. 18 comprises:
- a target Q-block 94 and associated LLE control unit 920 of an LLE creation subsystem 181 formed, with left neighbour quantum repeater node 182;
- a high-level right end node (REN) control unit 183 that includes a clock (not separately shown) synchronized by the herald signals of the LLE creation subsystem 181; the control unit interfaces with the RL-MC and LR-MC channel fibres and sends out a RL-MC cumulative failure message at the start of each cycle (as explained, above) and receives LR-MC cumulative failure and parity messages;
- an output buffer 185 comprising multiple Q-blocks 186 into a selected one of which the end of an entanglement rooted in target Q-block 94 can be shifted (this is done under the control of REN control unit 183 at the end of the relevant operating cycle).

The right end node 180 also interfaces with a local E2E entanglement consumer application 184 (shown dashed).

FIG. 18 depicts a particular optical fabric implementation that uses an optical merge unit 187 to couple the buffer Q-blocks 186 to the target Q-block 94. The buffer Q-blocks 186 have Capture interaction functionality and the target Q-block 94 already possesses the required Transfer interaction capability. To transfer the right end root of an E2E entanglement from the target Q-block 94 to a particular buffer Q-block 186, the latter is first entangled with the target Q-block 94 by an entanglement operation; this is effected by selectively energizing (under the control of REN control unit 183) the emitter associated with the buffer Q-block 186 concerned thereby causing a light field to traverse the qubit of that Q-block before being channelled by the optical merge unit 187 to the target Q-block 94 (as generally indicated by arrow 188). Thereafter, the target Q-block 94 is removed from entanglement by an X measurement operation. As these operations are carried out over a short distance, the probability of success is high.

The REN control unit 183 is responsible for keeping track of which buffer Q-blocks 186 are currently entangled and also of the operating cycle in which the E2E entanglement concerned was created (whereby to enable cumulative parity information received in LR-MC messages to be associated with the relevant buffer Q-block 186).

The left end node 190 shown in FIG. 19 comprises:
- a firing squad 97 with fusilier Q-blocks 93, and associated LLE control unit 910 of an LLE creation subsystem 191 formed, with right neighbour quantum repeater node 192;
- a high-level left end node (LEN) control unit 193 that includes the master clock (not separately shown); the control unit interfaces with the RL-MC and LR-MC channel fibres and sends out a LR-MC cumulative failure and parity message at the start of each cycle (as explained above) and receives RL-MC cumulative failure messages;
- an output buffer 195 comprising m Q-blocks 196 into a selected one of which the end of an entanglement rooted in a fusilier Q-block 93 can be shifted (this is done under the control of LEN control unit 193 at the end of the relevant operating cycle).

The left end node 190 also interfaces with a local E2E entanglement consumer application 194 (shown dashed).

FIG. 19 depicts a particular optical fabric implementation for coupling a selected one of the fusilier Q-blocks 93 to a particular buffer Q-block 196. The depicted optical fabric implementation avoids the use of an f×m optical switch that would otherwise be required to interface the f fusilier Q-blocks 93 with the m Q-blocks of the output buffer 195, this being achieved through the provision of an intermediary Q-block 197.

More particularly, in the FIG. 19 implementation, the f fusilier Q-blocks 93 are optically coupled through an optical merge unit 199 and local link fibre 1910 to the repeater node chain. The fusilier and buffer Q-blocks 93 and 196 all have Capture interaction functionality whereas the intermediary Q-block 197 has Transfer interaction capability. A 1×2 optical switch 1900 enables the output of the optical merge unit 199 to be switched between the local link fibre 1910 and a loop-back fibre 1920 that feeds an input of an optical merge unit 198; the outputs of the buffer Q-blocks are also coupled as inputs to the optical merge unit 198. The output of the optical merge unit 198 is coupled to the intermediary Q-block 197. This arrangement permits any selectively-fired one of the fusilier Q-blocks 93 or any selectively-fired one of the output-buffer Q-blocks 196 to be coupled to the intermediary Q-block 197. As a result, the left end of an E2E entanglement anchored in one of the fusilier Q-blocks 93 can be shifted across to the intermediary Q-block 197 and from there shifted into a selected one of the output-buffer Q-blocks 196, both shifts being effected by an elongate operation (see FIG. 1B); alternatively the selected output-buffer Q-block 196 can first be entangled, with the intermediary Q-block 197 and a merge operation then effected, between the latter and the fusilier Q-block 93 anchoring the E2E entanglement.

The LEN control unit 193 is responsible for controlling the selection of fusilier Q-block and buffer Q-block involved in the transfer of an E2E entanglement into the buffer 195, and for keeping track of which buffer Q-blocks 196 are currently entangled.

It will be appreciated that different optical fabric implementations are possible for the left and right end nodes to those illustrated in FIGS. 18 and 19; for example, to reverse the light-field direction of travel 188 in the right end node, an active optical switch could be used to optically couple the target Q-block 94 to a selected buffer Q-block 186 (in this case, the target Q-block 94 would need Capture interaction capability and the buffer Q-blocks 186 would need Transfer interaction capability).

It will further be appreciated that associated with the operation of moving an E2E entanglement into a buffer Q-block, will be one or more parity measurements. If a measured parity is even, no further action is needed as the parity of the E2E entanglement unchanged: however, if a measured parity is odd, then to keep the E2E entanglement the same, the buffer qubit concerned is flipped.

Various modifications, additional to those already alluded to above, can be made to the FIG. 10 quantum repeater embodiment. For example:
- Right-to-left LLE creation. As already indicated, the terms "left" and "right" are simply convenient labels for relative directions along the node chain. The FIG. 10 embodiment could equally as well been described in terms of the light-field trains 98 passing from right to left in the LLE creation subsystems (in which case, for LLE creation, the repeater L-side comprises fusilier Q-blocks and the repeater R-side is a target Q-blocks).
- Passing LLE Parity Information to Firing-Squad End of LLE Creation Subsystem.
 Rather than LLE parity information being held in register 196 of the LLE control unit 920 at the target end of each LLE creation subsystem, this parity information could be passed in message 930 to the LLE control unit 910 at the firing-squad end the LLE creation subsystems for storage in register 195. After the merge operation in the same cycle, this parity information would them be XORed with the merge parity information for storage in the parity queue 106.

Passing Cumulative Parity to Left End Node. Cumulative parity information could be passed to the left end node in the RL-MC messages rather than to the right end node in LR-MC messages.

Figure 20:
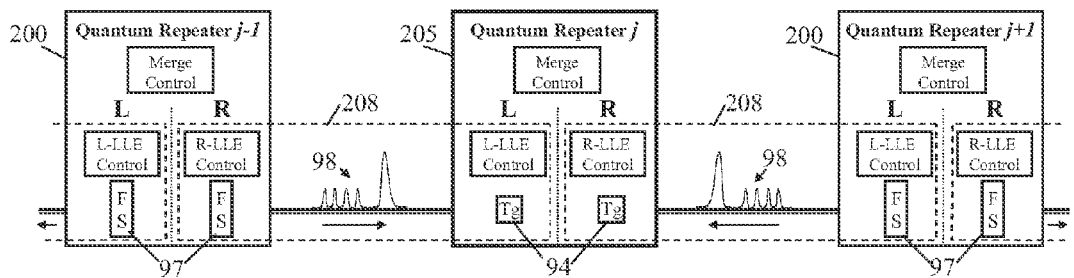
FIG. 20 is a diagram showing how two complimentary varieties of a repeater based on the FIG. 10 embodiment can be combined to form a repeater chain.

Complimentary Repeater Varieties. A hybrid form of quantum repeater, with two complimentary varieties, is possible in which the direction of travel of the light-field train 98 during LLE creation, is opposite for the left and right sides of the repeater. Thus, as depicted in FIG. 20, in one variety 200 of this hybrid repeater, light-field trains 98 are generated by the left and right side firing squads 97 of the repeater variety 200 and after passage through L and R fusilier Q-blocks respectively, are sent out over left and right local link fibres to the left and right neighbour nodes; in the other variety 205 of this hybrid repeater, light-field trains 98 are received by the left and right sides of the repeater variety 205 over left and right local link fibres respectively from the left and right neighbour nodes, are passed through L and R target Q-blocks 94 respectively, and are then measured. It will be appreciated that in a chain of quantum repeaters of the foregoing hybrid form, it is necessary to alternate the two varieties of repeater 200, 205 in order to create LLE creation subsystems.

Modifications can also be made with a view to increasing the rate of successful E2E entanglement creation. Several such modifications are identified below (it being understood that these modifications can be used alone or in combination to increase the rate of E2E entanglement creation):

Shortening the operating cycle. In the implementation described above, the length of the operating cycle Φ is four times the duration of the longest inter-node transit time τ; however, as already noted there is scope to substantially reduce the operating cycle duration to between two and three times τ.

Enhancing LLE creation success rate. An example modification of this nature is described below with reference to FIG. 21.

Parallel operation of node chain segments. An example modification of this nature is described, below with reference to FIG. 22;

Parallel LLE Creation. An example modification of this nature is described below in relation to the second "Synchronized" quantum repeater embodiment and with reference to FIGS. 23 to 26.

Figure 21:
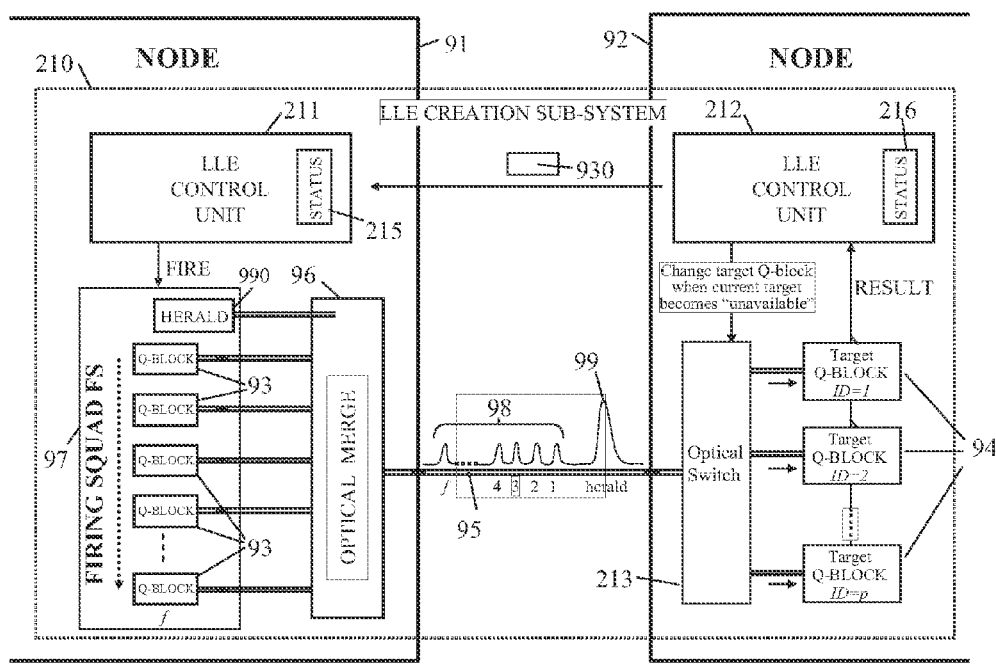
FIG. 21 is a diagram of an alternative local-link entanglement creation subsystem on which quantum repeaters of the FIG. 10 form can be based.

Enhancing LLE Creation Success Rate (FIG. 21)

FIG. 21 shows a modified form of the FIG. 9 LLE creation subsystem 90 in which more than one target Q-block 94 is provided. More particularly, in the FIG. 21 LLE creation subsystem 210 the basic arrangement of the quantum physical hardware (firing squad 97 and optical merge unit 96) in node 91 is the same as for the FIG. 9 subsystem; the LLE control unit 211 of the FIG. 21 subsystem does, however, differ in certain respects from the control unit 910 of FIG. 9 as will be explained below. The main difference between the FIG. 9 and FIG. 21 subsystems, is to be found in node 92 where the quantum physical hardware now comprises multiple (p in total) target Q-blocks 94 with respective IDs 1 to p, and an optical switch 213 for directing light fields received over the local link 95 to a selected one of the target Q-blocks 94. The optical switch 213 is controlled by LLE control unit 212 of node 92 such that all the incoming light fields are directed by the optical switch 213 to the same target Q-block 94 until a successful entanglement is created whereupon the optical switch 213 is switched to pass the incoming light fields to a new, available (un-entangled), target Q-block 94. The optical switch thus effectively performs the role of shuttering an entangled target qubit from subsequent light fields and thereby preventing interaction of these light fields with that qubit. Each successful entanglement is reported to the node 91 in a 'success' message 930 which may now also include (in addition to information permitting identification of the involved fusilier Q-block 93 and possibly parity information) the ID of the target Q-block 94 concerned.

Of course, the control unit 212 must keep track of the availability status of each of the target Q-blocks 94 since the control unit 212 is tasked with ensuring that the optical switch 213 only passes the incoming light fields to a target Q-block with an un-entangled qubit. This availability status can be readily tracked by the control unit 212 using a status register 216 arranged, to store a respective entry for each target Q-block 94. Each register entry not only records the availability of the corresponding target Q-block but is also used to record, in the case where the Q-block is unavailable (because its qubit is entangled with the qubit of a fusilier Q-block), related parity information unless this is passed back to node 91 instead.

Operating node 92 in this way ensures an efficient use of the light fields fired by the firing squad 97 as they are all used to attempt entanglement creation.

The control unit 211 of node 91 also includes a status register 215, this register being arranged to store a respective entry for each fusilier Q-block 93. Each register entry records the availability of the corresponding fusilier Q-block 93; a fusilier Q-block is 'unavailable' between when its qubit is entangled with the qubit of a target Q-block 94 (as indicated by a message 930) and when the entanglement concerned is used up. (All fusilier Q-blocks 94 are, of course, effectively 'unavailable' for the round trip time between when the firing squad is triggered and a message is received back from node 92 since it is not known whether any particular fusilier Q-block is, or is about to become, involved in an entanglement; however, such 'unavailability' may be ignored since whether any particular fusilier Q-block has become entangled will be known before the next firing of the firing squad 97. Each entry of register 215 is also used to record, in the case where the corresponding Q-block 93 is unavailable because its qubit is entangled, and parity information where such information has been provided in the related message 930.

Where multiple LLEs are created by a single triggering of the firing squad 97, the one or more LLEs created over and above the one to be used in the merge operation to be effected in the same operating cycle, can be put to a number of uses. Thus, one, some or all of these excess LLEs can be kept in reserve ('banked') in a queue and so immediately available to become the LLE to be merged in a following operating cycle should the LLE creation subsystem 210 fail to create any LLE in that cycle. This, of course, requires the relevant Q-blocks 93, 94 to be kept unavailable for participation in LLE creation which can be readily achieved through reference to the status registers 215,216. Also, the nodes sharing banked LLEs must use them in the same order (for example, the order in which they are reported in messages 930) otherwise a disjunction could occur in the line of merged LLEs intended to make up an E2E entanglement.

Excess LLEs can also be used in the process known as 'purification'. Purification raises the fidelity of an entanglement by combining two entanglements, via local quantum operations and classical communication, into one higher-fidelity pair.

It should be noted that 'banked' LLEs have a limited, lifetime even where qubit state has been transferred without delay from electron spin to nuclear spin; accordingly a track should be kept of the remaining lifetime of the qubits involved in banked LLEs with LLEs that include an expiring qubit being discarded.

Figure 22:
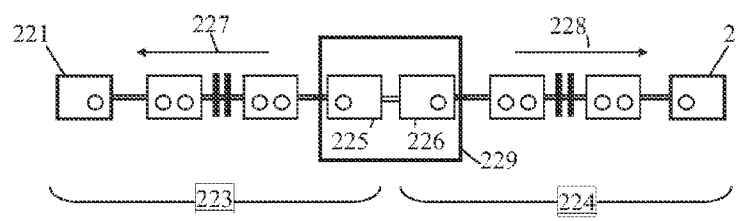
FIG. 22 is a diagram showing an example segmentation of a chain of quantum repeater nodes.

Parallel Operation of Node Chain Segments (FIG. 22)

By splitting the chain of nodes into multiple segments each with its own pair of left and right end nodes, creation of extended entanglements can be effected in parallel (over respective segments); these E2E segment entanglements can then be merged to created the final E2E entanglement.

One particular example arrangement of such segmentation is depicted in FIG. 22. In this case, the ultimate end nodes between which it is desired to create an E2E entanglement are left end node 221 and right end node 222. The chain of nodes (end nodes 221, 222 and intermediate repeater nodes) is divided into a first segment 223 and a second segment 224. The end nodes of the first segment 223 are the left end node 221 and a sub-node 225 of a segment-spanning node 229, this sub-node 225 serving as a right end node for the first segment. The end nodes of the second segment 224 are right end node 222 and a sub-node 226 of the segment-spanning node 229, this sub-node 226 serving as a left end node for the second segment.

The segment-spanning node 229 includes the master clock. The firing squads of the first segment 223 fire their light-field trains right to left (as indicated by arrow 227) whereas the firing squads of the second segment 224 fire their light-field trains left to right (as indicated by arrow 228); in this way, the synchronization signals formed by the light-field train heralds are propagated outwards from the segment spanning node 229.

The first and second segments 223, 224 create E2E segment entanglements in parallel time-wise in coordinated segment operating cycles. In due course, in each operating cycle the segment spanning node 229 will receive cumulative failure messages in respect of both segments indicating the success or failure of E2E segment entanglement creation. Assuming both E2E segment entanglements have been successfully created, the segment-spanning node 229 now merges these E2E segment entanglements to generate the desired E2E entanglement between nodes 221 and 222. The segment-spanning node 229 thus not only possesses end node functionality but also merge functionality.

Second "Synchronized" Quantum Repeater Embodiment (FIG. 23)

The second "Synchronized" quantum repeater embodiment 230 is shown in FIG. 23, it being understood that the quantum repeater 230 operates in the context of being an intermediate node in a chain of nodes (such as depicted in FIG. 8) between the left and right end nodes of which E2E entanglements are to be created.

The second quantum repeater embodiment 230 of FIG. 23 is similar in form and operation to the first quantum repeater embodiment 100 of FIG. 10 and the same references are used in FIG. 23 as in FIG. 10 for elements which are substantially the same. The main differences between the first and second embodiments is that in the second quantum repeater embodiment 230 the E2E operating cycle period is reduced by a factor of four, that is, to the previous quarter-cycle time P while the LLE creation subsystem operating cycle time remains at 4P. This is achieved by having four LLE creation subsystems in parallel between each pair of neighbour nodes (rather than just one) with the operation of the four paralleled LLE creation subsystems being staggered relative to each other by P—as a result, LLEs are created between each pair of neighbour nodes substantially at a rate of one per time period P, thereby enabling a merging of LLEs to form an E2E entanglement once every P.

More particularly, and as depicted in FIG. 23, quantum repeater 230 comprises:
- synchronized clock 103 (with clock cycle period P, for example);
- merge control unit 77, now arranged to trigger a merge operation every time period P;
- the target Q-blocks Tg1-Tg4 and associated L-LLE control units of four leftward LLE creation subsystems 71L1 to 71L4 (the firing squads FS of these LLE creation subsystems being provided by the left neighbour node 231L);
- a left LLE CCS coordinator 236 for coordinating the staggered cyclic operation of the four leftward LLE creation subsystems 71L1 to 71L4, and for interfacing the L-LLE control units of these LLE creation subsystems with the merge control unit 77;
- the firing squads FS1-FS4 and associated R-LLE control units of four rightward LLE creation subsystems 71R1 to 71R4 (the target Q-blocks Tg of these LLE creation subsystems being provided, by the right neighbour node 231R); and
- a right LLE CCS coordinator 237 for coordinating the staggered cyclic operation of the four rightward LLE creation subsystems 71R1 to 71R4, and for interfacing the R-LLE control units of these LLE creation subsystems with the merge control unit 77.

The four leftward LLE creation subsystems 71L1 to 71L4 share the same left local link fibre 62. The light trains from the different firing squads FS in the left neighbour node 231L are combined onto the fibre 62 via optical merge unit 232, these light trains being subsequently directed to the correct target Q-block Tg1 to Tg4 in the repeater 230 by optical switch 233 under the control of left LLECCS coordinator 236.

Similarly, the four rightward LLE creation subsystems 71R1 to 71R4 share the same right local link fibre 63. The staggering of the firing of the firing squads FS1 to FS 4 in the repeater 230 is controlled by the right LLE CCS coordinator 237 and the resultant light trains are combined onto the fibre 63 via optical merge unit 234; these light trains are subsequently directed to the correct target Q-block in the right neighbour node 231R by optical switch 235.

Figure 24:
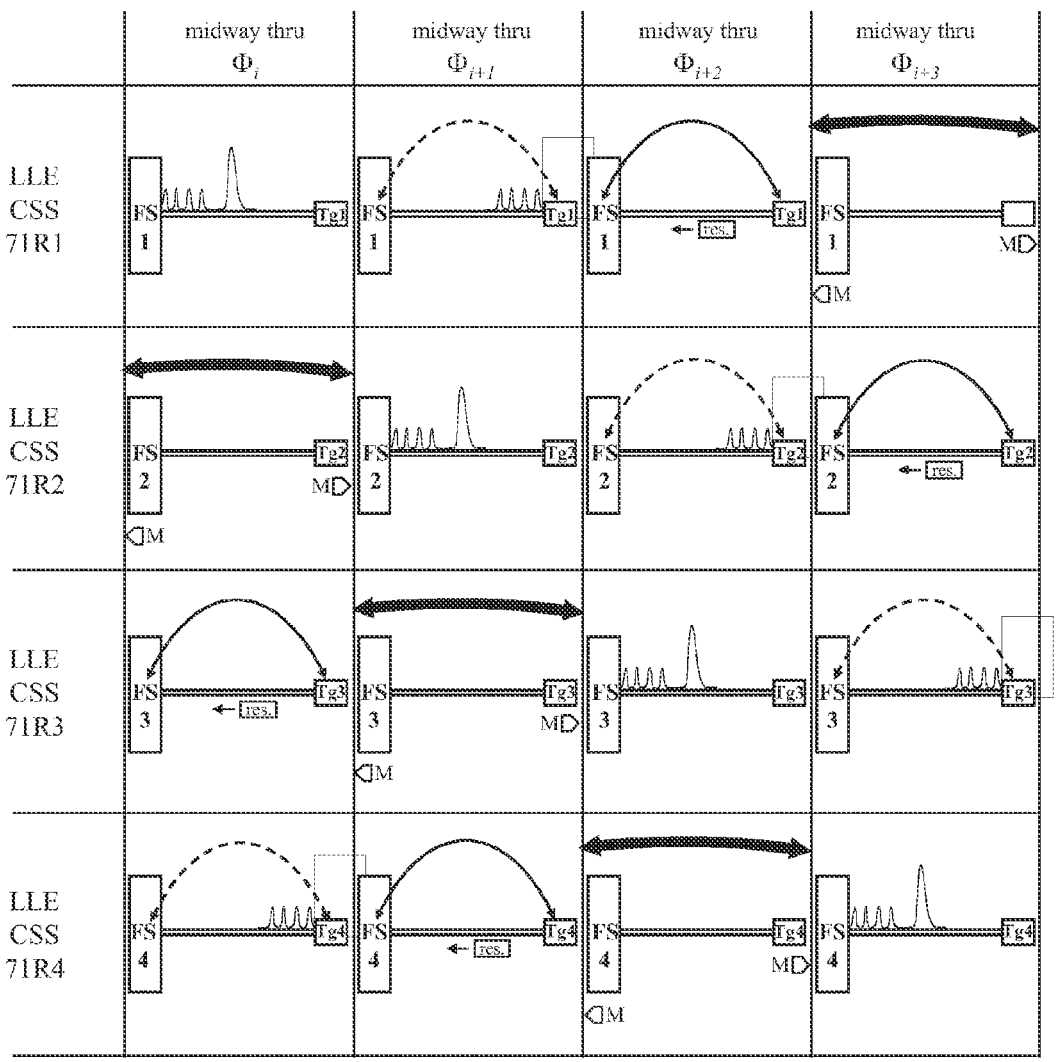
FIG. 24 is a diagram, similar to FIG. 15, showing the staggered operation of the paralleled local link entanglement creation subsystems existing between the FIG. 23 repeater and one neighbour node.

By way of example, FIG. 24 shows, for each of the four rightward LLE creation subsystems 71R1 to 71R4, a respective depiction (similar that of FIG. 15) of what is happening midway through each quarter period P of the LLE creation subsystem operating cycle. As already explained above, each such quarter period P now corresponds to a E2E operating cycle $\Phi$ and accordingly each quarter period P is identified by a corresponding E2E operating cycle $\Phi_i$ to $_{i+3}$ (see top row of FIG. 24). In FIG. 24, the firing squads FS1 to FS4 of LLE creation subsystems 71R1 to 71R4 are shown as being fired in successive E2E operating cycles $\Phi_i$ to $\Phi_{i+3}$. Merge operations involving the qubits entangled through operation of the LLE creation subsystems 71R1 to 71R4, are shown as occurring in E2E operating cycles to $\Phi_{i+3}$, $\Phi_i$, $\Phi_{i+1}$, and $\Phi_{i+2}$ respectively, these merge operations each being part of the distributed merging that creates an E2E entanglement in each E2E operating cycle (c.f. FIG. 8).

With regard to the merge operations effected by the merge control unit 77, in the FIG. 23 repeater 230 the merge control unit 77 interfaces with the LLE CSS coordinators 236 and 237 rather than with the LLE control units of the LLE creation subsystems as was the case for the FIG. 10 embodiment. The right LLE CSS coordinator 237 is responsible for providing to the merge control unit 77 the identity of the rightward LLE creation subsystem and the fusilier qubit of that subsystem next to be merged, and the left LLE CSS coordinator 236 is responsible for providing to the merge control unit 77 parity information on the target qubit to be involved in the same merge from one of the leftward LLE creation subsystems (this being the leftward LLE creation subsystem whose cycle of operation is in step with the rightward LLE creation subsystem concerned, it being assumed that the merge control unit knows or can be made aware of the appropriate in-step association between the leftward and rightward LLE creation subsystems).

Figure 25:
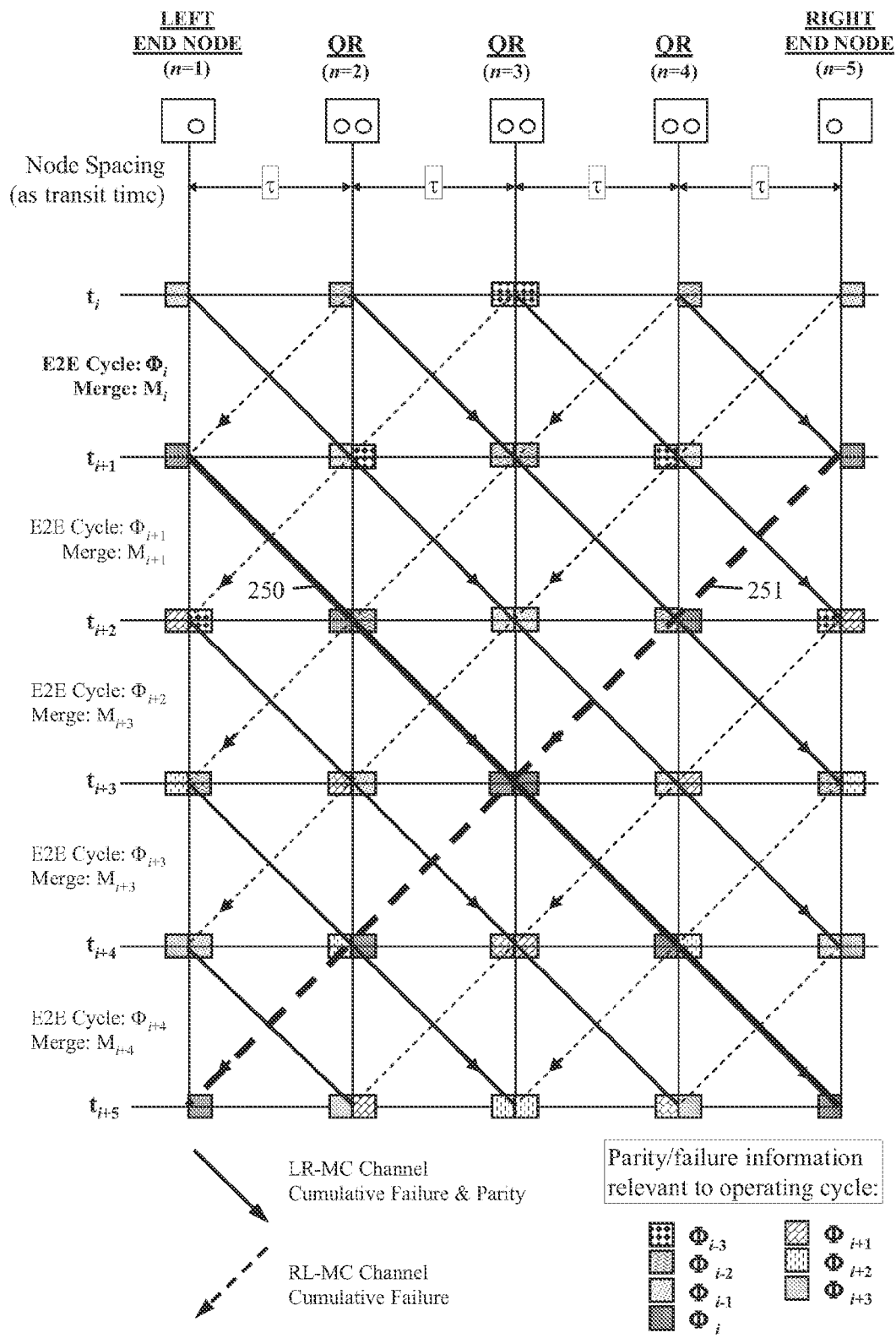
FIG. 25 is a message flow diagram depicting one example messaging arrangement for accumulating the failure and parity information for a chain of repeaters of the FIG. 23 form.

FIG. 25 depicts for the FIG. 23 repeater embodiment (in a manner similar to FIGS. 16 and 17 for the FIG. 10 repeater embodiment) a message flow diagram in respect of an example messaging arrangement for accumulating failure and parity information in the LR-MC and RL-MC messages passing along a chain of five nodes ail spaced by the same distance corresponding to a transit time of $\tau$. It will be recalled that, in the present example case, the value of the time period P is set to be equal to this transit time of $\tau$ whereby, for the FIG. 23 repeater embodiment, the transit time between nodes is equal to the cycle time of the E2E operating cycle $\Phi$. FIG. 25 covers the time period $t_i$ to $t_{i+5}$ (that is, the duration of three operating cycles $\Phi_i$ to $\Phi_{1+4}$). The LR-MC message flow accumulating failure and parity information for operating cycle $\Phi_i$ is shown by the thick solid line 250 and the RL-MC message flow accumulating failure information for operating cycle $\Phi_j$ is shown by the thick dashed line 251.

As can be seen, each node transmits on cumulative failure and parity information at the start of the next E2E cycle following its receipt and the effect is a substantially continuous onward transmission of the cumulative failure and parity information (it being appreciated that in practice the period P would need to be slightly greater than $\tau$ to allow for processing at each node, in particular the incorporation of the local failure and parity information). This is similar to the message flow diagram shown in FIG. 17 in respect of the second example messaging arrangement for the FIG. 10 embodiment. However, because only one cumulative failure and parity message is sent per direction per E2E operating cycle, the relationship between current E2E cycle, node position, and the cumulative failure and parity information being sent out at the start of the current E2E cycle, is as in the first example messaging arrangement for the FIG. 10 embodiment, that is:

for the LR-MC message being sent out in the $c^{th}$ E2E operating cycle $\Phi_c$ by quantum repeater node j, the cumulative failure and parity information will relate to the $(c-j)^{th}$ E2E operating cycle;

for the RL-MC message being sent out in the $c_{th}$ E2E operating cycle $\Phi_c$ by quantum repeater node j in a chain of N nodes, the cumulative failure information will relate to the $(c-1-(N-j))^{th}$ E2E operating cycle.

It will be appreciated, that many of the modifications discussed above in relation to the FIG. 10 quantum repeater embodiment are equally applicable to the FIG. 23 quantum repeater embodiment.

In addition, further modifications can be made to both the FIG. 10 and FIG. 23 quantum repeater embodiments. For example, the possibility described above with reference to FIG. 21 of 'banking' LLEs makes it possible to decouple the LLE creation subsystem operating cycle from the E2E/repeater-top-level operating cycle provided the average ongoing (though not necessarily continuous) LLE creation rate is substantially at least as great as the frequency of the E2E operating cycle (thus, if a FIG. 21 LLE creation subsystem formed between two repeaters results in an average creation rate of 1.5 LLEs per triggering of its firing squad, the LLE creation subsystem period can be longer than the E2E cycle period).

As already mentioned, the reliable creation of LLEs is not limited to the use of the "firing squad" form of LLE creation subsystem, other LLE creation subsystems being appropriate in certain cases. By way of example, high reliability can be achieved by using in parallel multiple LLE creation subsystems of the FIG. 5 form though this would require multiple local link fibres.

For various reasons it may be desirable to arrange for the merging of leftward and rightward entanglements that is effected by the described quantum repeater embodiments each top-level cycle, to be carried out through the intermediary of one or more local qubits ('intermediate qubits') rather than directly by earning out a 'merge operation' of the form described, above on the relevant repeater L-side and R-side qubits. For example, where one intermediate qubit is provided, the leftward and rightward entanglements can be separately extended to the intermediate qubit by respective elongate operations involving the entangled L-side/R-side qubit (as appropriate) and the intermediate qubit; thereafter, the intermediate qubit is removed from entanglement by performing an X measurement operation upon it. It will be appreciated that the details of how the local merging of a repeater's leftward and rightward entanglements is effected is not critical to the general manner of operation of a quantum repeater operating on the 'Synchronous' basis.

With regard to the implementation of the LLE control units 72, 73 and the merge control unit 77 of both the FIG. 10 and FIG. 23 embodiments, as well as the coordinators 236, 237 of the FIG. 23 embodiment, it will be appreciated that typically the described functionality will be provided, by a program-controlled, processor or corresponding dedicated hardware. Furthermore, the functionality of the LLE control units, the coordinators where present, and the merge control unit may in practice be integrated, particularly in cases where the LLE control unit functionality is minimal. Of course, the division of control functionality is to a degree arbitrary; however, LLE control functionality merits separation into the LLE control units because in certain repeater embodiments LLE creation is free-running, that is, decoupled from the timing of higher level operations such as merge control. Overlying the LLE control functionality is the control functionality associated with merge control and operating-cycle synchronisation— this latter control functionality effectively provides top level control of the repeater and can be considered as being provided by a top-level control arrangement (in the described embodiments this is formed by the merge control unit and the clock).

Although in the foregoing description light fields have generally been described as being sent over optical fibres both between nodes and between components of the quantum physical hardware of a repeater, it will be appreciated that light fields can be sent over any suitable optical channel whether guided (as with an optical waveguide) or unguided (straight line) and whether through free space or a physical medium. Thus, for example, the optical fabric of the quantum physical hardware of a repeater may comprise silicon channels interfacing with a qubit provided by a nitrogen atom in a diamond lattice located within an optical cavity.

As already indicated, persons skilled in the art will understand how the Q-blocks can be physically implemented and relevant example implementation details can be found in the following papers, herein incorporated by reference:

"Fault-tolerant quantum repeaters with minimal physical resources, and implementations based on single photon emitters" L. Childress, J. M. Taylor, A. S. Sørensen, and M. D. Lukin; Physics Review A 72, 052330 (2005).

"Fault-Tolerant Quantum Communication Based on Solid-State Photon Emitters" L. Childress, J. M. Taylor, A. S. Sørensen, and M. D. Lukin Physical Review Letters 96, 070504 (2006).

"Hybrid quantum repeater based on dispersive CQED interactions between matter qubits and bright coherent light" T D Ladd, P van Loock, K Nemoto, W J Munro, and Y Yamamoto; New Journal of Physics 8 (2006) 184, Published 8 Sep. 2006.

"Hybrid Quantum Repeater Using Bright Coherent Light" P. van Loock, T. D. Ladd, K. Sanaka, F. Yamaguchi, Kae Nemoto, W. J. Munro, and Y. Yamamoto; Physical Review Letters 96, 240501 (2006).

"Distributed Quantum Computation Based-on Small Quantum Registers" Liang Jiang, Jacob M. Taylor, Anders S. Sørensen, Mikhail D. Lukin; Physics. Review. A 76, 062323 (2007),

The invention claimed is:

1. A quantum repeater optically couplable to left and right neighbour nodes through local-link optical channels; the repeater comprising:
   quantum physical hardware providing left-side and right-side repeater portions (L, R) respectively arranged to support left-side and right-side qubits for entanglement with qubits in the left and right neighbour nodes respectively by light fields transmitted over the local-link channels thereby to form respective local link entanglements, herein "LLE"s; the quantum physical hardware being operable to merge two entanglements respectively involving a left-side and a right-side qubit, by locally operating on these qubits;
   left and right LLE control units for controlling the quantum physical hardware to effect on-going creation of left and right LLEs in cooperation with the left and right neighbour nodes; and
   a top-level control arrangement operative to control top-level cyclic operation of the repeater in synchronism with its neighbour nodes, the top-level control arrangement being arranged once every top-level operating cycle to initiate merging of entanglements respectively involving a left-side and a right-side qubit when these qubits are at least expected to be entangled leftwards and rightwards respectively.

2. A quantum repeater according to claim 1, wherein the LLE control units are arranged to effect cyclic creation of said left and right LLEs in synchronism with the top-level operating cycle.

3. A quantum repeater according to claim 1, wherein the left-side repeater portion (L) and the right-side repeater portion (R) are complimentary in form; one of these repeater portions (L, R) being operative to generate a light field, pass it through its qubit, and then send the light field out over a local link channel; and the other repeater portion (R, L) being operative to receive a light field over a local link channel, pass it through its qubit and then measure the light field.

4. A quantum repeater according to claim 3, wherein:
   one of the left-side and right-side repeater portions (L, R) comprises a plurality of fusilier Q-blocks each arranged to support a fusilier qubit and to pass a light field through that qubit, and an optical fabric for orderly coupling light fields that have passed through fusilier qubits, onto the corresponding local link channel being arranged to control this repeater portion to cause the coordinated passing of respective light fields through the fusilier qubits whereby to produce an outgoing train of closely-spaced light fields on the local link channel; and
   the other of the left-side and right-side repeater portions (R, L) comprises a target Q-block arranged to support a target qubit and to measure a light field passed through that qubit whereby to determine whether the target qubit has been successfully entangled, and an optical fabric for coupling the corresponding local link channel with the target Q-block to enable light fields of an incoming train of light fields received over the local link channel from a neighbour node to pass through the target qubit and be measured; a corresponding one of the LLE control units being arranged to control this repeater portion to allow a first light field of the train to pass through and potentially interact with the target qubit and thereafter only to allow a next light field through and potentially interact with the target qubit upon the target Q-block indicating that the preceding light field was unsuccessful in entangling the target qubit, this LLE control unit being responsive to the target Q-block indicating that the target qubit has been successfully entangled to pass, to the neighbour node originating the train, information identifying the light field of the train which successfully entangled the target qubit whereby to permit identification of the fusilier qubit entangled with the target qubit.

5. A quantum repeater according to claim 4, wherein the number f of fusilier Q-blocks is such as to satisfy the inequality:

$$P_{success} \leq 1-(1-s)^f$$

where:
   s is the probability of successfully creating an entanglement with a single light field for a predetermined operating environment; and
   $P_{success}$ is a desired probability of successfully entangling the target qubit with a single light-field train, $P_{success}$ being selected to be at least 99%.

6. A quantum repeater according to claim 4, wherein the LLE control unit associated with the repeater portion (R) including the fusilier Q blocks is arranged to trigger the generation of a said outgoing train of light fields once every top-level operating cycle, and wherein the top-level control arrangement is arranged to initiate said merging of entanglements in each top-level operating cycle at a timing sufficient to allow information identifying, from amongst the light fields of the outgoing train generated in that cycle, the light field which has successfully entangled a neighbour-node target qubit to be returned to the repeater from the neighbour node concerned.

7. A quantum repeater according to claim 1, wherein for each top-level operating cycle, the top-level control arrangement is arranged to store parity information based on:
   merge parity information in respect of the merging of entanglements carried out in that cycle; and
   parity information in respect of an LLE involving a said qubit subject of the local merging of entanglements effected in the cycle.

8. A quantum repeater according to claim 7, wherein the top-level control arrangement is arranged once per top-level cycle to receive from one neighbour node cumulative parity information relating to a predetermined previous top-level operating cycle, to combine its stored parity information relating to that cycle with the received cumulative parity information to form updated cumulative parity information, and to send on the updated cumulative parity information to its other neighbour node.

9. A system, comprising a chain of nodes, for creating an end-to-end entanglement between working qubits in left and right opposite end nodes of the chain, intermediate nodes of the chain being formed by quantum repeaters with each quantum repeater being linked to its neighbour nodes by local link optical channels; the top-level control arrangements of the repeaters being arranged to cause the synchronization of their top-level operating cycles whereby in each cycle the combined effect of the merging of entanglements in each quantum repeater is to create a said end-to-end entanglement.

10. A system according to claim 9, wherein each end node includes an output buffer arranged to provide a qubit into which the end of an end-to-end entanglement that is anchored in a working qubit of the end node, can be transferred in order to free up that working qubit.

11. A system according to claim 9, wherein the top-level control arrangement of each repeater includes a synchronization arrangement, these synchronization arrangements being coordinated through a signal passed along said chain from one end node.

12. A system according to claim 9, wherein the top-level control arrangement of each repeater includes a synchronization arrangement, these synchronization arrangements being coordinated through signals independently received at each repeater from a common external source.

13. A method of creating an end-to-end entanglement between qubits in first and second end nodes of a chain of optically-coupled nodes whose intermediate nodes) are quantum repeaters, the method comprising:
creating, on an on-going basis, local link entanglements, herein "LLE"s, between qubits in each pair of neighbour nodes in said chain, the LLEs being created through interaction of the qubits with light fields transmitted between the nodes; and
effecting synchronized top-level cyclic operation of the quantum repeaters with each repeater initiating, once every top-level operating cycle, a merging of two entanglements each involving a respective qubit of the repeater when these qubits are at least expected to be entangled with qubits in nodes disposed in opposite directions along the chain from the repeater.

14. A method according to claim 13, wherein LLEs are cyclically created in synchronism with the top-level cyclic operation of the quantum repeaters.

15. A method according to claim 14, wherein LLEs are created between at least one pair of neighbour nodes coupled by an optical channel, by:
passing respective light fields through a plurality of fusilier qubits in one node of said pair and into the optical channel, the generation and organization of the light fields being such as to result in a train of closely-spaced light fields being transmitted along the optical channel;
receiving, at the second node of said pair, light fields of said train over the optical channel and while a target qubit remains un-entangled, allowing each light field to pass in turn through, and potentially interact with, the target qubit, each light field thereafter being measured to determine whether the target qubit has been entangled,
upon successful entanglement of the target qubit, inhibiting interaction of further light fields of the train with the target qubit and identifying which light field successfully entangled the target qubit whereby to permit identification of the fusilier qubit entangled with the target qubit.

16. A method according to claim 13, wherein for each top-level operating cycle, each quantum repeater stores parity information based on:
merge parity information in respect of the merging of entanglements carried out in that cycle; and
parity information in respect of an LLE involving a said qubit subject of the merging of entanglements effected in the cycle.

17. A method according to claim 16, wherein once per top-level cycle each quantum repeater:
receives from one neighbour node cumulative parity information relating to a predetermined previous top-level operating cycle,
combines its stored parity information relating to that cycle with the received cumulative parity information to form updated cumulative parity information, and
sends on the updated cumulative parity information to its other neighbour node.

\* \* \* \* \*

UNITED STATES PATENT AND TRADEMARK OFFICE
CERTIFICATE OF CORRECTION

Page 1 of 3

PATENT NO. : 9,111,229 B2
APPLICATION NO. : 13/378383
DATED : August 18, 2015
INVENTOR(S) : Keith Harrison et al.

It is certified that error appears in the above-identified patent and that said Letters Patent is hereby corrected as shown below:

In the Drawings

In sheet 5 of 19, Figure 6, line 11 approx., delete "PHYICAL" and insert -- PHYSICAL --, therefor.

In sheet 6 of 19, Figure 7, line 16 approx., delete "PHYICAL" and insert -- PHYSICAL --, therefor.

In sheet 9 of 19, Figure 10, line 34 approx., delete "PHYICAL" and insert -- PHYSICAL --, therefor.

In the Specification

In column 2, line 10, delete "nodes" and insert -- nodes. --, therefor.

In column 2, line 19, delete "byway" and insert -- by way --, therefor.

In column 2, line 51, delete "invention:" and insert -- invention; --, therefor.

In column 4, line 50, delete "correlated," and insert -- correlated --, therefor.

In column 6, line 2, delete "involved," and insert -- involved --, therefor.

In column 6, line 3, delete "-entangled," and insert -- -entangled --, therefor.

In column 6, line 11, delete "omitted," and insert -- omitted --, therefor.

In column 6, line 28, delete "farther" and insert -- further --, therefor.

In column 7, line 62, delete "emitted," and insert -- emitted --, therefor.

In column 8, line 22, delete "depicted," and insert -- depicted --, therefor.

In column 9, line 38, delete "used," and insert -- used --, therefor.

In column 9, line 38, delete "used," and insert -- used --, therefor.

Signed and Sealed this
Nineteenth Day of April, 2016

Michelle K. Lee
*Director of the United States Patent and Trademark Office*

In column 9, line 48, delete "ail" and insert -- all --, therefor.

In column 9, line 54, delete "stated:" and insert -- stated, --, therefor.

In column 9, line 57, delete "stated," and insert -- stated --, therefor.

In column 9, line 61, delete "ILL" and insert -- LLE --, therefor.

In column 10, line 17, delete "cars" and insert -- can --, therefor.

In column 11, line 44, delete "called," and insert -- called --, therefor.

In column 11, line 50, delete "field," and insert -- field --, therefor.

In column 12, line 24, delete "field," and insert -- field --, therefor.

In column 12, line 61, delete "depicted," and insert -- depicted --, therefor.

In column 13, line 7, delete "anode," and insert -- a node --, therefor.

In column 13, line 40, delete "played," and insert -- played --, therefor.

In column 14, line 22, delete "arranged," and insert -- arranged --, therefor.

In column 16, line 32, delete "ail" and insert -- all --, therefor.

In column 16, line 55, delete "arched," and insert -- arched --, therefor.

In column 16, line 58, delete "third," and insert -- third --, therefor.

In column 18, line 2, delete "lire" and insert -- fire --, therefor.

In column 18, line 32, delete "associated," and insert -- associated --, therefor.

In column 19, line 4, delete "contained," and insert -- contained --, therefor.

In column 20, line 23, delete "depicted," and insert -- depicted --, therefor.

In column 22, line 11, delete "carried," and insert -- carried --, therefor.

In column 23, line 56, delete "lour" and insert -- four --, therefor.

In column 24, line 34, delete "field," and insert -- field --, therefor.

In column 24, line 43, delete "associated," and insert -- associated --, therefor.

In column 24, line 65, delete "created," and insert -- created --, therefor.

In column 25, line 51, delete "created," and insert -- created --, therefor.

In column 26, line 30, delete "depicted," and insert -- depicted --, therefor.

CERTIFICATE OF CORRECTION (continued)
U.S. Pat. No. 9,111,229 B2

In column 26, lines 39 and 40, delete "in formation" and insert -- information --, therefor.

In column 26, line 57, delete "if" and insert -- it --, therefor.

In column 28, line 38, delete "fall" and insert -- full --, therefor.

In column 29, line 3, delete "formed," and insert -- formed --, therefor.

In column 29, line 10, delete "explained," and insert -- explained --, therefor.

In column 29, line 47, delete "formed," and insert -- formed --, therefor.

In column 30, line 25, delete "entangled," and insert -- entangled --, therefor.

In column 30, line 26, delete "effected," and insert -- effected --, therefor.

In column 30, line 46, delete "unchanged:" and insert -- unchanged; --, therefor.

In column 31, line 42, delete "described," and insert -- described --, therefor.

In column 31, line 60, delete "to p," and insert -- to $p$, --, therefor.

In column 32, line 16, delete "arranged," and insert -- arranged --, therefor.

In column 32, line 66, delete "limited," and insert -- limited --, therefor.

In column 34, line 23, delete "provided," and insert -- provided --, therefor.

In column 35, line 18, delete "ail" and insert -- all --, therefor.

In column 35, line 55, delete "appreciated," and insert -- appreciated --, therefor.

In column 36, line 19, delete "described," and insert -- described --, therefor.

In column 36, line 35, delete "provided," and insert -- provided --, therefor.

In column 36, line 36, delete "controlled," and insert -- controlled --, therefor.

In the Claims

In column 37, line 66, in Claim 4, delete "channel" and insert -- channel; a corresponding of the LLE control units --, therefor.

In column 39, line 29, in Claim 13, delete "nodes)" and insert -- nodes --, therefor.